United States Patent
Ideshio et al.

(10) Patent No.: US 8,641,573 B2
(45) Date of Patent: Feb. 4, 2014

(54) POWER TRANSMISSION UNIT FOR VEHICLE

(75) Inventors: Yukihiko Ideshio, Susono (JP); Hideaki Komada, Gotenba (JP); Takashi Ohta, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 923 days.

(21) Appl. No.: 12/665,348

(22) PCT Filed: Jun. 18, 2008

(86) PCT No.: PCT/JP2008/061497
§ 371 (c)(1),
(2), (4) Date: Dec. 18, 2009

(87) PCT Pub. No.: WO2008/156193
PCT Pub. Date: Dec. 24, 2008

(65) Prior Publication Data
US 2010/0197436 A1 Aug. 5, 2010

(30) Foreign Application Priority Data
Jun. 19, 2007 (JP) ................................. 2007-161770

(51) Int. Cl.
*F16H 37/02* (2006.01)
(52) U.S. Cl.
USPC ........................................................ 475/218
(58) Field of Classification Search
USPC ........................................................ 475/218
See application file for complete search history.

(56) References Cited

U.S. PATENT DOCUMENTS

| | | | |
|---|---|---|---|
| 5,433,282 A | 7/1995 | Moroto et al. |
| 5,643,119 A | 7/1997 | Yamaguchi et al. |
| 5,788,006 A | 8/1998 | Yamaguchi |
| 5,935,035 A | 8/1999 | Schmidt |
| 6,251,037 B1 | 6/2001 | Baumgaertner et al. |
| 6,634,986 B2 | 10/2003 | Kima |

(Continued)

FOREIGN PATENT DOCUMENTS

| EP | 1 038 722 A1 | 9/2000 |
| EP | 1 209 017 A2 | 5/2002 |

(Continued)

OTHER PUBLICATIONS

Official Communication issued on Aug. 10, 2011 in the corresponding European Application No. 08 777 562.3.

(Continued)

*Primary Examiner* — Erin D Bishop
(74) *Attorney, Agent, or Firm* — Oblon, Spivak, McClelland, Maier & Neustadt, L.L.P.

(57) ABSTRACT

A power transmission unit including: a first prime mover; speed change gear pairs; output members; a differential mechanism, which has a first rotary element connected with the first prime mover, a second rotary element, and a third rotary element selectively outputting the power to the output member, and adapted to perform a differential action among those three rotary elements; and a second prime mover connected with the second rotary element. The speed change gear pair includes at least one pair of first speed change gear pair, arranged between the first rotary element and the output member and allowed to transmit the torque selectively, and at least one pair of second speed change gear pair arranged between the third rotary element and the output member and allowed to transmit the torque selectively. A locking mechanism locks the second prime mover selectively to halt a rotation of the second prime mover.

22 Claims, 20 Drawing Sheets

(56) References Cited

U.S. PATENT DOCUMENTS

| | | |
|---|---|---|
| 6,645,105 B2 | 11/2003 | Kima |
| 6,719,655 B2 | 4/2004 | Kramer |
| 6,817,327 B2 | 11/2004 | Ehrlinger et al. |
| 7,128,677 B2 | 10/2006 | Supina et al. |
| 7,314,421 B2 | 1/2008 | Kim |
| 7,314,424 B2 | 1/2008 | Supina et al. |
| 7,575,529 B2 | 8/2009 | Holmes |
| 8,075,436 B2 | 12/2011 | Bachmann |
| 2002/0065168 A1 | 5/2002 | Kima |
| 2003/0045389 A1 | 3/2003 | Kima |
| 2003/0100395 A1 | 5/2003 | Hiraiwa |
| 2003/0166429 A1 | 9/2003 | Tumback |
| 2004/0168841 A1 | 9/2004 | Ohta et al. |
| 2006/0169078 A1 | 8/2006 | Hiraiwa |
| 2007/0131046 A1 | 6/2007 | Borgerson |
| 2007/0254761 A1 | 11/2007 | Kim |
| 2008/0024268 A1 | 1/2008 | Wong et al. |
| 2008/0242468 A1 | 10/2008 | Wafzig |
| 2009/0001887 A1 | 1/2009 | Takeuchi et al. |
| 2009/0017649 A1 | 1/2009 | Wu et al. |
| 2010/0173746 A1 | 7/2010 | Ideshio et al. |

FOREIGN PATENT DOCUMENTS

| | | |
|---|---|---|
| FR | 2 824 509 | 11/2002 |
| JP | 5-319110 | 12/1993 |
| JP | 8-295140 | 11/1996 |
| JP | 2000-69611 | 3/2000 |
| JP | 2000-142139 | 5/2000 |
| JP | 2001-200899 | 7/2001 |
| JP | 2002-204504 | 7/2002 |
| JP | 2003-72403 | 3/2003 |
| JP | 2003-531764 | 10/2003 |
| JP | 2004-161053 | 6/2004 |
| JP | 2004-263708 | 9/2004 |
| JP | 2004-293795 | 10/2004 |
| JP | 2004-322935 | 11/2004 |
| JP | 2005-155891 | 6/2005 |
| JP | 2005-331063 | 12/2005 |
| JP | 2006-38136 | 2/2006 |
| JP | 2006-44521 | 2/2006 |
| JP | 2006-298246 | 11/2006 |
| JP | 2007-519867 | 7/2007 |
| WO | WO 03/047898 A1 | 6/2003 |

OTHER PUBLICATIONS

U.S. Appl. No. 12/664,709, filed Dec. 15, 2009, Ideshio, et al.
Office Action issued in co-pending U.S. Appl. No. 12/664,709 on Jun. 7, 2013.

|  | S1 | S2 | SL |
|---|---|---|---|
| 1st | ① | × | ×→○ |
| 2nd | × | ② | × |
| 3rd | ③ | × | ○ |
| 4th | × | ④ | × |

(a) 1ST(MG Locked)

(b) 1ST→2ND(MG Unlocked)

(c) 1ST→2ND(2nd Clutch→2nd Clutch Engaged→1st Clutch Disengaged)

(d) 2ND(E/G Connected Mechanically)

(e) 2ND→3RD(3rd Clutch Synchronized→3rd Clutch Engaged)

(f) 2ND→3RD(2nd Clutch Disengaged→MG Locked)

(g) 3RD(MG Locked)

(a) 3RD (b) 3RD→MG Torque Synchronized #1

(c) MG Unlocked (d) Rotatinal Speed Synchronized→2nd Driven Clutch Engaged (e) MG Torque Synchronized #2

(f) MG Asisted

Fig. 9

|     | S11 | S12 | SL |
|-----|-----|-----|----|
| 1st | R   | ×   | ○  |
| 2nd | C   | ×   | ×  |
| 3rd | ×   | R   | ○  |
| 4th | ×   | C   | ×  |

(a) 1ST (MG Locked)

(b) 1ST→2ND(MG Unlocked→E/G-Gear No.1 Synchronized)

(c) 2ND(E/G-1st Engaged)

(d) 2ND→3RD(Gear No.2-R Eaed ngaged→E/G-Gear No.1 Disengaged)

(e) 3RD(MG Locked)

Fig. 12

|     | S21 | S22 | S23 | SR | SL |
|-----|-----|-----|-----|----|----|
| 1st | ① | × | × | × | ×→P |
| 2nd | × | ② | × | × | × |
| 3rd | × | × | R | × | M |
| 4th | × | × | C | × | × |
| 5th | ⑤ | × | × | × | P |
| 6th | × | ⑥ | × | × | × |
| Rev | × | × | × | ○ | ×→P |

Fig. 14

|     | S1 | S2 | S5 | SR | SL |
|-----|----|----|----|----|-----|
| 1st | ① | × | × | × | ×→○ |
| 2nd | × | ② | × | × | × |
| 3rd | ③ | × | × | × | ○ |
| 4th | × | ④ | × | × | × |
| 5th | × | × | ⑤ | × | ○ |
| 6th | × | × | × | ⑥ | × |
| Rev | × | × | × | R | ×→○ |

Fig. 16

|     | S1 | S2 | SR | SL  |
|-----|----|----|----|-----|
| 1st | ① | × | × | ×→○ |
| 2nd | × | ② | × | × |
| 3rd | ③ | × | × | ○ |
| 4th | × | ④ | × | × |
| Rev | × | × | ○ | ×→○ |

Fig. 18

|  | S1 | S2 | SR | SL |
|---|---|---|---|---|
| 1st | ① | × | × | ×→○ |
| 2nd | × | ② | × | × |
| 3rd | ③ | × | × | ○ |
| 4th | × | ④ | × | × |
| 5th | × | × | ⑤ | ○ |
| Rev | × | × | R | × |

POWER TRANSMISSION UNIT FOR VEHICLE

TECHNICAL FIELD

This invention relates to a power transmission unit for a vehicle adapted to transmit a power outputted from a prime mover such as an engine, an electric motor or the like to an output member such as an output shaft, an output gear or the like. More specifically, the present invention relates to a power transmission unit, which is adapted to vary a ratio between a rotational speed of the prime mover and a rotational speed of the output member by a speed change gear pair.

BACKGROUND ART

In order to vary an output torque according to need, or to control the rotational speed of the prime mover to an efficient speed, the power transmission unit of this kind has been used widely in the prior art. Specifically, a mechanism comprising a plurality of gear pairs is used in general to vary the torque and the rotational speed. In case of using the gear pairs to vary the torque and the rotational speed, power transmission efficiency can be improved in comparison with that in the case of using a belt, a chain or a fluid.

For example, Japanese Patent Laid-Open No. 2002-204504 discloses a power transmitting system composed mainly of a twin-clutch type transmission. The system disclosed in Japanese Patent Laid-Open No. 2002-204504 comprises: two clutch shafts connected selectively with an engine by a clutch; a plurality of gear pairs arranged between the clutch shafts and an output shaft; and a clutch mechanism for connecting the gear pairs selectively with the clutch shaft or with the output shaft. A differential motor generator having a rotor and a stator both of which are rotatable are arranged between those clutch shafts, and connected with each clutch shaft through a bevel gear. That is, the motor generator is arranged perpendicular to the clutch shafts.

On the other hand, Japanese Patent Laid-Open No. 2004-293795 discloses a transmission system, which is adapted to distribute a torque of an engine to two clutch shafts through a differential type motor generator, and to output the torque from the clutch shafts to an output shaft through gear pairs individually set to a predetermined gear ratio.

In addition to above, Japanese Patent Laid-Open No. 2002-155891 discloses a driving device comprising a Ravigneaux type planetary gear mechanism having four rotary elements. An engine is connected with a predetermined rotary element, two of rotary elements serve as output elements, and a motor generator is connected with the remaining rotary element. According to the driving device disclosed in Japanese Patent Laid-Open No. 2002-155891, those rotary elements are individually connected with a gear pair for setting a gear stage, and in case of setting a specific gear stage, the motor generator is halted to use the Ravigneaux type planetary gear mechanism as a speed reducing mechanism.

The systems taught by Japanese Patent Laid-Opens Nos. 2002-204504 and 2004-293795 are adapted to rotate the motor utilizing a difference between a gear ratio of the gear used to drive a vehicle and a gear ratio of the vacant gear. That is, the motor has to be rotated inevitably when the engine is connected directly to drive the vehicle by the power of the engine. Therefore, power loss may be increased as a result of rotating the motor unnecessarily.

On the other hand, according to the device taught by Japanese Patent Laid-Open No. 2002-155891, although such a "drag loss" under the gear stage in which the motor generator is halted can be reduced, the power has to be transmitted through the two gear pairs under the remaining gear stages. Thus, a number of the gear has to be involved in the power transmission and the power loss is therefore increased.

DISCLOSURE OF THE INVENTION

The present invention has been conceived noting the technical problems thus far described, and its object is to provide a power transmission unit for a vehicle capable of improving a fuel economy by reducing a power loss.

In order to achieve the above-mentioned object, according to the present invention, there is provided a power transmission unit for a vehicle, which has: a first prime mover; a plurality of speed change gear pairs, each of which has a different gear ratio, and to which a power outputted from the first prime mover is transmitted; an output member for outputting the power transmitted from the speed change gear pair; and a selective power transmission mechanism for allowing a power transmission to the output member by selecting any of the speed change gear pairs from said plurality of speed change gear pairs, characterized by comprising: a second prime mover; a differential mechanism, which has at least a first rotary element connected with the first prime mover, a second rotary element connected with the second prime mover, and a third rotary element, and which is adapted to perform a differential action among at least those three rotary elements; a first speed change gear pair system, which has at least one of said speed change gear pairs, and which is arranged between the first rotary element and the output member; a second speed change gear pair system, which has at least one of said speed change gear pairs, and which is arranged between the third rotary element and the output member; and a locking mechanism for locking the second prime mover selectively to halt a rotation of the second prime mover.

According to the present invention, the differential mechanism includes a planetary gear mechanism. The second rotary element is arranged to be situated between the first rotary element and the third rotary element in a nomographic diagram of the planetary gear mechanism, and the planetary gear mechanism is adapted to rotate the third rotary element in a direction opposite to a rotational direction of the first rotary element in case the vehicle is driven in the forward direction.

According to the present invention, the power transmission unit further comprises a speed change control means, which is adapted to lock the second prime mover by the locking mechanism in case of setting a predetermined gear stage by allowing the second speed change gear pair system to transmit the torque between the third rotary element and the output member, and to unlock the second prime mover locked by the locking mechanism in case of setting another predetermined gear stage by allowing the first speed change gear pair system to transmit the torque between the first rotary element and the output member.

According to the present invention, the power transmission unit further comprises a synchronizing means for synchronizing a rotational speed of the speed change gear pair system to be shifted from the other speed change gear pair system to transmit a torque to the output member by a speed change operation, with a rotational speed thereof to be achieved after the speed change operation, by varying a rotational speed of the second prime mover when carrying out the speed change operation.

According to the present invention, the power transmission unit further comprises a cooperative control means which controls output torques of the first and the second prime movers cooperatively thereby preventing the rotational speed of the output member from being changed, in case of varying the rotational speed of the second prime mover by the synchronizing means.

According to the power transmission unit of the present invention, the output member includes a first output shaft and a second output shaft arranged parallel to a rotation axis of the differential mechanism, an idler shaft is arranged parallel to the rotation axis of the differential mechanism, the first speed change gear pair system includes a first drive gear to which a torque is transmitted from the first rotary element and a first driven gear arranged on the first output shaft, and the second speed change gear pair system includes a second drive gear to which a torque is transmitted from the third rotary element and which is arranged on the idler shaft and a second driven gear arranged on the second output shaft.

The power transmission unit of the present invention further comprises a final reduction mechanism, which is adapted to perform a differential action, and to which the torques are transmitted from the first and the second output shafts. According to the present invention, the first prime mover and the differential mechanism are arranged to share a common rotational axis, the idler shaft and the second output shaft are arranged to be situated above a plane including rotational center axes of the first prime mover and the final reduction mechanism under the condition that the power transmission unit is mounted on the vehicle, and the first output shaft is arranged to be situated below the plane including the rotational center axes of the first prime mover and the final reduction mechanism under the condition that the power transmission unit is mounted on the vehicle.

According to the present invention, the selective power transmission mechanism includes a gear stage selecting means which selects a gear stage in which the output member is allowed to output a relatively larger torque in case of driving the vehicle by driving the second prime mover, from a gear stage to be set by transmitting the torque to the output member through the first speed change gear pair system, and a gear stage to be set by transmitting the torque to the output member through the second speed change gear pair system.

The power transmission unit of the present invention further comprises a speed change control altering means for altering a control content to carry out a speed change operation depending on a driving mode, between a driving mode in which a power outputted from the first prime mover is used to drive the vehicle and a power outputted from the second prime mover is used to assist to drive the vehicle, and a driving mode in which the vehicle is driven by the power of the second prime mover or a driving mode in which the vehicle is decelerating while regenerating energy by the second prime mover.

The power transmission unit of the present invention further comprises: a first clutch means for switching the first speed change gear pair system to be connected directly with the first prime mover, and to be connected with the second rotary element; and a second clutch means for switching the second speed change gear pair system to be connected directly with the first prime mover, and to be connected with the third rotary element.

According to the present invention, the first speed change gear pair system and the first clutch means are situated on a side across a center axis of the differential mechanism from a side where the second speed change gear pair and the second clutch means are situated.

According to the present invention, the selective power transmission mechanism includes: a third clutch means which integrates the differential mechanism entirely by connecting at least two of the rotary elements of the first to the third rotary elements with each other; a fourth clutch means which allows the second speed change gear pair system selectively to transmit a torque between the third rotary element and the output member; and a fifth clutch means which allows the first speed change gear pair system selectively to transmit a torque between the first rotary element and the output member.

According to the present invention, a reverse stage gear pair, which is selectively allowed to transmit the torque between the third rotary element and the first output shaft, is arranged between the third rotary element and the first output shaft.

According to the present invention, the output member includes a first output shaft and a second output shaft arranged parallel to a rotation axis of the differential mechanism, the first speed change gear pair system includes a first drive gear to which a torque is transmitted from the first rotary element and a first driven gear arranged on the first output shaft, the second gear pair system includes a second drive gear to which a torque is transmitted from the third rotary element and a second driven gear arranged on the second output shaft, and the power transmission unit of the present invention further comprises an inverting mechanism for inverting a direction of a torque outputted from any one of the first and the second output shafts to be opposite to that of the torque outputted from other output shaft.

According to the present invention, the reverse mechanism is arranged on an output side of the second output shaft, and the power transmission unit of the present invention further comprises a reverse stage gear pair for setting a reverse stage situated between the third rotary element and the first output shaft.

A according to the power transmission unit of the present invention, the reverse mechanism is arranged on an output side of the second output shaft, the reverse stage gear pair for setting a reverse stage is arranged between the first rotary element and the second output shaft, and the power transmission unit of the present invention further comprises a friction start mechanism for increasing a torque transmission capacity continuously between the first prime mover and the first rotary element.

According to the present invention, the first prime mover and the differential mechanism are arranged to share a common rotational axis, and the power transmission unit of the present invention further comprises a reverse mechanism, which is adapted to output the torque transmitted thereto from the third rotary element of the differential mechanism while reversing a torque direction, and which is arranged on the rotational axis of the first prime mover between the differential mechanism and the first speed change gear pair system or the second speed change gear pair system.

The power transmission unit of the present invention further comprises: a reverse gear pair comprising a reverse drive gear to which the torque without being reversed by the reverse mechanism is transmitted from the second rotary element and which is arranged coaxially with the differential mechanism, and a reverse driven gear meshing with the reverse drive gear and held by the output member; and a sixth clutch means for allowing the reverse gear pair selectively to transmit the torque between the second rotary element and the output member.

The power transmission unit of the present invention further comprises: a speed reducing mechanism which transmits the output of the second prime mover to the second rotary element while reducing the speed of the output of the second prime mover.

Thus, according to the present invention, the second rotary element of the differential mechanism can be halted by locking the second prime mover by the locking mechanism. In this situation, the torque can be inputted to the first rotary element from the first prime mover, and outputted from the third rotary element to the second speed change gear pair system. Therefore, a predetermined speed change ratio (i.e., a gear stage) can be set by speed change actions of the differential mechanism and the second speed change gear pair system. In this case, the second prime mover will not be rotated, therefore, a power loss such a "drag loss" can be reduced. On the other hand, the first speed change gear pair system is connected with the first rotary element to which the first prime mover is connected. Therefore, a number of the speed change gear pairs being involved in the torque transmission can be reduced under the speed change ratio (i.e., the gear stage) set by the first speed change gear pair system. For this reason; the power loss can be reduced.

BRIEF DESCRIPTION OF THE DRAWINGS

FIG. 9 is a table showing relations between gear stages and engagement states of the clutches in the example shown in FIG. 7.

FIG. 12 is a table showing relations between gear stages and engagement states of the clutches in the example shown in FIG. 11.

FIG. 14 is a table showing relations between gear stages and engagement states of the clutches in the example shown in FIG. 13.

FIG. 16 is a table showing relation between gear stages and engagement states of the clutches in the example shown in FIG. 15.

FIG. 18 is a table showing relation between gear stages and engagement states of the clutches in the example shown in FIG. 17.

BEST MODE FOR CARRYING OUT THE INVENTION

Figure 1:
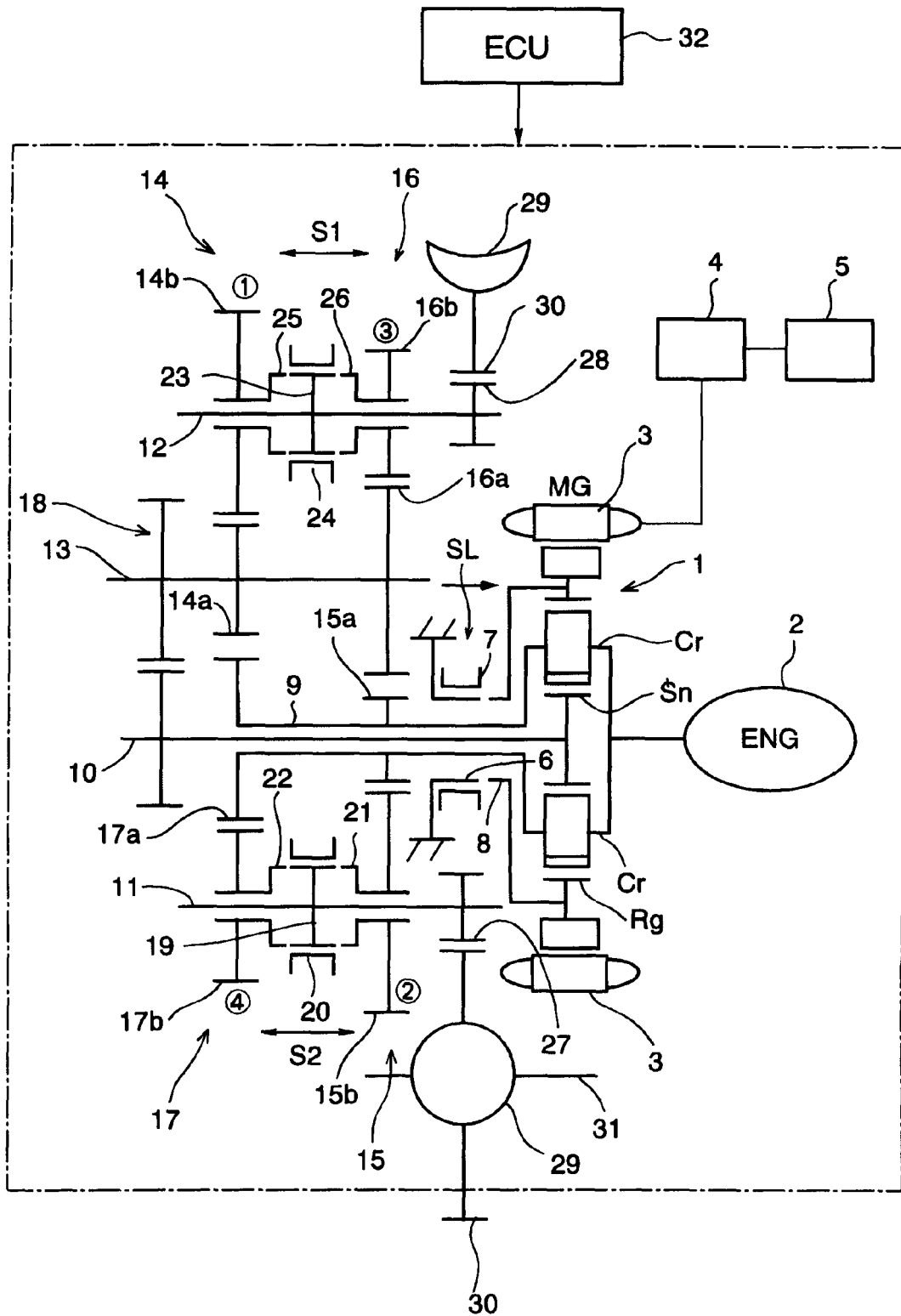
FIG. 1 is a skeleton diagram showing one example of a power transmission unit according to the present invention.

Next, this invention will be described in connection with its specific examples. A power transmission unit according to the present invention is to be mounted in a vehicle when used. Basically, the power transmission unit is adapted to transmit a power outputted from a first prime mover such as an engine to an output member through a speed change gear pair selected from a plurality of speed change gear pairs each of which has a different gear ratio, and to output the power from the output member. The power transmission unit is also adapted to assist the torque by a second prime mover such as an electric motor or a motor generator according to need, or to output the power from the second prime mover for driving the vehicle. For example, an internal combustion engine such as a gasoline engine, a diesel engine or the like is typically used as the first prime mover, but another kind of power unit e.g., a motor or the like may also be used as the first prime mover.

On the other hand, the second prime mover is preferably adapted to be controlled electrically to output both positive and negative torques. The speed change gear pair comprises a drive gear and a driven gear always meshing with each other. Specifically, the speed change gear pair commonly used in a known manual transmission and a twin clutch type transmission for vehicles may be used in the power transmission unit of the present invention. A plurality of speed change gear pairs are required to be arranged in the power transmission unit, and a number of settable speed change ratios (i.e., gear stages) can be increased by increasing a number of the speed change gear pairs. As a result, a rotational speed and a drive torque of the prime mover can be controlled more sensitively. In the example shown in FIG. 1, four speed change gear pairs are arranged.

According to the present invention, those speed change gear pairs are categorized into a first speed change gear pair system and a second speed change gear pair system, and a power of the first prime mover is transmitted to the output member selectively from the first speed change gear pair system or the second speed change gear pair system. In order to switch the power transmission route between the first and the second speed change gear pair systems, the power transmission unit of the present invention is provided with a mechanism composed mainly of a differential mechanism.

Specifically, the differential mechanism comprises at least three rotary elements to perform a differential action, and a single pinion type planetary gear mechanism and a double pinion type planetary gear mechanism are typically used as the differential mechanism. However, mechanisms other than the planetary gear mechanism may also be used. In addition, the rotary element is an element of the differential mechanism capable of being connected with some kind of an external member.

The aforementioned three rotary elements are functionally categorized into an input element, an output element and a reaction (or fixed) element. Specifically, according to the present invention, the first prime mover is connected with the input element, the drive gears of the speed change gear pairs are connected with the output element, and the second prime mover is connected with the reaction element. Additionally, the first prime mover is adapted not only to output the torque but also to generate a friction torque in case the energy is not being supplied thereto, that is, when it is not activated. On the other hand, the second prime mover is adapted to generate a negative torque when it is rotated backwardly or when regenerating the energy.

In case the power transmission unit is mounted on the vehicle and connected with a wheel, a power may also be inputted from the output member to the differential mechanism. Therefore, the aforementioned input element, output element and reaction element will not permanently function as the input element, output element and reaction element. For example, the input element may be switched to function as the reaction element, or the reaction element may be switched to function as the output element depending on the situation of the power transmission unit.

According to the present invention, the second rotary element connected with the second prime mover is preferably arranged to be situated between the first and the third rotary elements in a nomographic diagram, and the third rotary element is preferably adapted to be rotated in a direction opposite to a rotational direction of the first rotary element. According to the power transmission unit thus structured, rotational speeds of the second prime mover and the second rotary element connected thereto are limited to relatively low speeds. Since the rotational speed of the second prime mover is thus limited, an output of the second prime mover can be suppressed even when it is driven during a speed change operation. For this reason, the second prime mover can be downsized. Moreover, according to the above-explained structure in which the rotary elements are thus arranged in the nomographic diagram, the speed range of the second prime mover connected with the second rotary element is limited within the low speed ranges of both positive and negative directions across zero point (i.e., halted) during a speed change operation. Therefore, the required output of the second prime mover during the speed change operation can be decreased.

As described, the power transmission unit of the present invention further comprises a speed change control means, which is adapted to lock the second prime mover by the locking mechanism in case of setting a predetermined gear stage by allowing the second speed change gear pair system to transmit the torque between the third rotary element and the output member, and to unlock the second prime mover locked by the locking mechanism in case of setting another predetermined gear stage by allowing the first speed change gear pair system to transmit the torque between the first rotary element and the output member. According to the power transmission unit thus structured, the gear stage of using the second speed change gear pair system, and the gear stage of using the first speed change gear pair system are set as explained above. Therefore, a so-called "speed change synchronous control" can be carried out by controlling a rotational speed of the second prime mover during the speed change operation. As a result, an occurrence of a shift shock can be prevented or reduced.

As also described, the power transmission unit of the present invention further comprises a synchronizing means for synchronizing a rotational speed of the speed change gear pair system to be shifted from the other speed change gear pair system to transmit a torque to the output member after a speed change operation, with a rotational speed thereof to be achieved after the speed change operation, by varying a rotational speed of the second prime mover when carrying out the speed change operation. According to the power transmission unit thus structured, a synchronous control can be carried out when carrying out the speed change operation. Therefore, an abrupt fluctuation of the rotational speed and the torque as a result of shifting the speed change gear pair system to be involved in the torque transmission can be minimized. For this reason, deterioration of a shift shock can be prevented.

As also described, the power transmission unit of the present invention further comprises a cooperative control means which controls output torques of the first and the second prime movers cooperatively thereby preventing the rotational speed of the output member from being changed, in case of varying the rotational speed of the second prime mover by the synchronizing means. According to the power transmission unit thus structured, the output torque of the first prime mover can be controlled in cooperation with the second prime mover in addition to carrying out the synchronous control by the second prime mover, in case of varying the rotational speed of the second prime mover to synchronize the rotational speeds. Therefore, a shift shock resulting from a temporal depression in the driving torque can be prevented or minimized.

As also described, according to the power transmission unit of the present invention, the output member includes a first output shaft and a second output shaft arranged parallel to a rotation axis of the differential mechanism, an idler shaft is arranged parallel to the rotation axis of the differential mechanism, the first speed change gear pair system includes a first drive gear to which a torque is transmitted from the first rotary element and a first driven gear arranged on the first output shaft, and the second speed change gear pair system includes a second drive gear to which a torque is transmitted from the third rotary element and a second driven gear arranged on the second output shaft. According to the power transmission unit thus structured, a number of the gears arranged coaxially can be reduced. Therefore, the power transmission unit can be downsized entirely in its axial direction.

As also described, the power transmission unit of the present invention further comprises a final reduction mechanism, which is adapted to perform a differential action, and to which the torques are transmitted from the first and the second output shafts. In addition, according to the power transmission unit of the present invention, the first prime mover and the differential mechanism are arranged to share a common rotational axis, the idler shaft and the second output shaft are arranged to be situated above a plane including a rotational axes of the first prime mover and the final reduction mechanism under the condition that the power transmission unit is mounted on the vehicle, and the first output shaft is arranged to be situated below the plane including the rotational axes of the first prime mover and the final reduction mechanism under the condition that the power transmission unit is mounted on the vehicle. According to the power transmission unit thus structured, only the first output shaft is situated below the line connecting the rotational axes of the first prime mover and the final reduction mechanism. Thus, a number of the axes situated at the lower position can be reduced. Therefore, a lowest position of the vehicle from the ground will not be lowered so that interference of the lowest position of the vehicle with the road surface can be prevented.

As also described, according to the power transmission unit of the present invention, the selective power transmission mechanism includes a gear stage selecting means for selecting a gear stage in which the output member is allowed to output a relatively larger torque in case of driving the vehicle by driving the second prime mover, from a gear stage to be set by transmitting the torque to the output member through the first speed change gear pair system, and a gear stage to be set by transmitting the torque to the output member through the second speed change gear pair system. According to the power transmission unit thus structured, therefore, the gear stage in which the output member outputs the larger torque is selected from the plurality of settable gear stages, in case of driving the second prime mover and transmitting the power of the second prime mover to the output member. For this reason, the torque can be assisted sufficiently using the second prime mover.

As also described, the power transmission unit of the present invention further comprises a speed change control altering means for altering a control content to carry out a speed change operation depending on a driving mode, between a driving mode in which a power outputted from the first prime mover is used to drive the vehicle and a power outputted from the second prime mover is used to assist to drive the vehicle, and a driving mode in which the vehicle is driven by the power of the second prime mover or a driving mode in which the vehicle is decelerating while regenerating energy by the second prime mover. Therefore, the power transmission route can be switched depending on the case, between the case in which the vehicle is driven by both of the powers of the first and the second prime movers, and the case in which the vehicle is driven only by the power of the second prime mover. Thus, according to the present invention, the speed change control is carried out depending on the driving mode or running condition of the vehicle.

As also described, the power transmission unit of the present invention further comprises: a first clutch means for switching the first speed change gear pair system to be connected directly with the first prime mover, and to be connected with the second rotary element; and a second clutch means for switching the second speed change gear pair system to be connected directly with the first prime mover, and to be connected with the third rotary element. According to the power transmission unit thus structured, therefore, both of the first and the second speed change gear pair systems can be used selectively to transmit the power under both gear stages to be set by transmitting the power of the first prime mover directly, and the gear stages to be set using the differential mechanism. As a result, a number of settable gear stages can be increased using all of the gear pairs commonly.

As also described, according to the power transmission unit of the present invention, the first speed change gear pair system and the first clutch means are situated on a side across a center axis of the differential mechanism from a side where the second speed change gear pair and the second clutch means are situated. Thus, the speed change gear pair systems are divided to be situated on both sides of the differential mechanism. Therefore, the clutch means is not covered by a connecting member for transmitting the torque or the like. In other words, the member for switching the connection state while moving in the axial direction is exposed to an outer circumferential side. For this reason, a positive clutch means can be used.

As also described, the selective power transmission mechanism includes: a third clutch means for integrating the differential mechanism entirely by connecting at least two of the rotary elements of the first to the third rotary elements with each other; a fourth clutch means for selectively allowing the second speed change gear pair system to transmit a torque between the third rotary element and the output member; and a fifth clutch means for selectively allowing the first speed change gear pair system to transmit a torque between the first rotary element and the output member. According to the power transmission unit thus structured, the third to fifth clutch means function as explained above. Therefore, at least three gear stages can be set, and the rotational speed of the second prime mover can be varied during the speed change operation. For this reason, the so-called a "speed change synchronous control" can be carried out thereby preventing or minimizing a shift shock. Moreover, a number of settable gear stages can be increased using all of the gear pairs commonly.

As also described, according to the power transmission unit of the present invention, a reverse stage gear pair, which is selectively allowed to transmit the torque between the third rotary element and the first output shaft, is arranged between the third rotary element and the first output shaft. According to the power transmission unit thus structured, a reverse stage can be set by transmitting the torque to the output member through the reverse stage gear pair. In this case, since the torque is outputted from the third rotary element to the reverse stage gear pair, the differential mechanism can be used as a speed change mechanism thereby obtaining a large driving force. Moreover, since the torque of the third rotary element can be varied continuously by varying the torque of the second prime mover connected with the second rotary element, the vehicle is allowed to start smoothly in the reverse direction.

As also described, according to the power transmission unit of the present invention, the output member includes a first output shaft and a second output shaft arranged parallel to a rotation axis of the differential mechanism, the first speed change gear pair system includes a first drive gear to which a torque is transmitted from the first rotary element and a first driven gear arranged on the first output shaft, the second gear pair system includes a second drive gear to which a torque is transmitted from the third rotary element and a second driven gear arranged on the second output shaft, and the power transmission unit of the present invention further comprises an inverting mechanism for inverting a torque direction of one of the first and the second output shafts to be opposite to that of the other output shaft. According to the power transmission unit thus structured, the torque direction in case of outputting the power from the first rotary element of the differential mechanism, and the torque direction in case of outputting the power from the third rotary element of the differential mechanism are opposite to each other. However, since the inverting mechanism is arranged on one of the output sides of the first and the second output shafts, it is unnecessary to reverse the torque direction on the route from the differential mechanism to the output shafts. For this reason, the member such as the idler shaft or the like is unnecessary to be interposed between the differential mechanism and the output shafts, so that the power transmission unit can be downsized entirely in its radial direction.

As also described, according to the power transmission unit of the present invention, the reverse mechanism is arranged on an output side of the second output shaft, and the power transmission unit of the present invention further comprises a reverse stage gear pair for setting a reverse stage situated between the third rotary element and the first output shaft. According to the power transmission unit thus structured, the second output shaft itself is rotated in the direction to drive the vehicle backwardly. However, since the reverse mechanism is arranged on the output side of the second output shaft, it is possible to drive the vehicle in the forward direction even in case of outputting the torque from the second output shaft. On the other hand, since the reverse stage gear pair is arranged on the forward stage side of the first output shaft, the rotational direction of the first output shaft is reversed thereby driving the vehicle backwardly.

As also described, according to the power transmission unit of the present invention, the reverse mechanism is arranged on an output side of the second output shaft, the reverse stage gear pair for setting a reverse stage is arranged between the first rotary element and the second output shaft, and the power transmission unit of the present invention further comprises a friction start mechanism for increasing a torque transmission capacity continuously between the first prime mover and the first rotary element. According to the power transmission unit thus structured, the first prime mover is connected with the reverse stage gear pair through the first rotary element under the reverse stage, and the torque transmitted to the reverse stage gear pair from the first prime mover is increased gradually by the friction start mechanism. Therefore, the vehicle is allowed to start smoothly in the backward direction.

As also described, according to the power transmission unit of the present invention, the first prime mover and the differential mechanism are arranged to share a common rotational axis, and the power transmission unit of the present invention further comprises a reverse mechanism, which is adapted to output the torque transmitted thereto from the third rotary element while reversing a torque direction, and which is arranged on the rotational axis of the first prime mover between the differential mechanism and the first speed change gear pair system or the second speed change gear pair system. According to the power transmission unit thus structured, the rotational direction of the torque inputted to the first speed change gear pair system or to the second speed change gear pair system is switched between the forward direction and the backward direction. Therefore, it is unnecessary to arrange a member to reverse the rotational direction such as an idler shaft or the like in the output side of any of the speed change gear pairs, in other words, in a downstream side in the torque transmitting direction, even if the direction of the torque outputted from the first rotary element and the direction of the torque outputted from the third rotary element are opposite to each other. For this reason, the power transmission unit can be downsized entirely in its radial direction.

As also described, the power transmission unit of the present invention further comprises: a reverse gear pair comprising a reverse drive gear to which the torque without being reversed by the reverse mechanism is transmitted from the second rotary element and which is arranged coaxially with the differential mechanism, and a reverse driven gear meshing with the reverse drive gear and held by the output member; and a sixth clutch means for allowing the reverse gear pair selectively to transmit the torque between the second rotary element and the output member. According to the power transmission unit thus structured, the reverse stage can be set using the first prime mover as a driving source.

As also described, the power transmission unit of the present invention further comprises: a speed reducing mechanism for transmitting the output of the second prime mover to the second rotary element while reducing the speed of the output of the second prime mover. According to the power transmission unit thus structured, the torque outputted from the second prime mover can be inputted to the second rotary element of the differential mechanism while being increased. Therefore, the second prime mover can be downsized.

FIG. 1 is a diagram showing an example of a power transmission unit comprising a differential mechanism composed mainly of a double pinion type planetary gear mechanism. As shown in FIG. 1, the double pinion type planetary gear mechanism 1 corresponding to the differential mechanism of the present invention comprises: a sun gear Sn as an external gear; a ring gear Rg as an internal gear, which is arranged concentrically with the sun gear Sn; and a carrier Cr, which holds a first pinion gear meshing with the sun gear Sn, and a second pinion gear meshing with the first pinion gear and with the ring gear Rg in a rotatable and revolvable manner.

An engine (ENG) 2 is connected with the carrier Cr. The engine 2 and the planetary gear mechanism 1 are preferably arranged to situate their rotational axes on a common axis. However, the engine 2 and the planetary gear mechanism 1 may also be arranged on different axes and connected through a transmission mechanism such as a gear mechanism, a chain and so on. On the other hand, a motor generator (MG) 3 corresponding to the second prime mover of the present invention is connected with the ring gear Rg. For example, the motor generator 3 is a permanent magnet type synchronous motor, and a rotor thereof is connected with the ring gear Rg and a stator thereof is fixed to a not shown casing or the like.

The motor generator 3 is entirely formed into an annular or a cylindrical shape, and the planetary gear mechanism 1 is arranged in an inner circumferential side of the motor generator 3. That is, the motor generator 3 and the planetary gear mechanism 1 are situated on substantially same place in the axial direction, and the motor generator 3 and the planetary gear mechanism 1 are overlapped at least partially in a radial direction. For this reason, the motor generator 3 is allowed to output relatively large torque by enlarging the size of the outer circumference thereof, and the inner space of the power transmission unit can be used efficiently by arranging a diametrically large portion of the motor generator 3 in the engine 2 side.

The motor generator 3 is connected with an electric storage device 5 such as a secondary battery or the like through a controller 4 such as an inverter. The controller 4 is adapted to control an output torque and a rotational speed of the motor generator 3 by varying a current or a voltage to be fed to the motor generator 3, and to control an amount of electricity generated in case the motor generator 3 is rotated compulsory by an external force, as well as the torque required to carry out such generation.

The rotation of the ring gear Rg connected with the motor generator 3 can be halted by controlling the motor generator 3 as explained above. However, the power transmission unit of the present invention is provided with a locking mechanism for halting the rotation of the ring gear Rg (i.e., setting a locking state) without consuming the electricity. The locking mechanism is adapted to halt the rotation of the motor generator 3 or the ring gear Rg connected therewith by connecting the motor generator 3 or the ring gear Rg to a predetermined fixing member, and an engagement mechanism such as a positive clutch (i.e., a dog clutch), a frictional clutch and so on may be used as the locking mechanism.

Specifically, a positive type locking mechanism (i.e., a lock clutch) SL is arranged in the example shown in FIG. 1. For example, a dog clutch, which is adapted to connect the rotor of the motor generator 3 with the fixing member by engaging a sleeve with a spline, can be used as the locking mechanism SL. Specifically, a fixed hub 6 integrated with the fixing member is arranged adjacent to the motor generator 3, and a sleeve 7 is fitted with a spline formed on an outer circumference of the fixed hub 6, in a manner to move in an axial direction of the fixed hub 6 and to rotate integrally with the fixed hub 6.

Meanwhile, a hub 8 having a spline to be engaged with the sleeve 7 is arranged integrally with the rotor of the motor generator 3. Therefore, a rotation of the rotor of the motor generator 3 is halted when the rotor of the motor generator 3 is connected with the fixing member, by moving the sleeve 7 toward the motor generator 3 side thereby engaging the sleeve 7 with the hub 8. A mechanism for reciprocating the sleeve 7 axially is not especially shown in FIG. 1. However, according to the example shown in FIG. 1, an actuator, which is adapted to be reciprocated by a thrust force such as an oil pressure, an electromotive force and so on, is employed to reciprocate the sleeve 7 in its axial direction.

A first drive shaft 9 and a second drive shaft 10 are arranged in the opposite side of the engine 2 across the planetary gear mechanism 1. Specifically, the first drive shaft 9 is a hollow shaft arranged coaxially with the planetary gear mechanism 1 in a rotatable manner, and one of the end portions thereof is connected with the carrier Cr. As described, the carrier Cr is connected with the engine 2, that is, the first drive shaft 9 is also connected with the engine 2. Meanwhile, the second drive shaft 10 is inserted into the first drive shaft 9 in a manner to rotate relatively with the first drive shaft 9, and one of the end portions of the second drive shaft 10 is connected with the sun gear Sn. According to the example shown in FIG. 1, therefore, the carrier Cr corresponds to the first rotary element of the present invention, the ring gear Rg corresponds to the second rotary element of the present invention, and the sun gear Sn corresponds to the third rotary element of the present invention.

The second drive shaft 10 is longer than the hollow first drive shaft 9, therefore, the second drive shaft 10 protrudes from the first drive shaft 9. An output shaft 11 and an output shaft 12 corresponding to the output member of the present invention are arranged parallel to the drive shafts 9 and 10 in a rotatable manner, and an idler shaft 13 is arranged between the output shaft 12 and the drive shafts 9 and 10 in a rotatable manner.

There are arranged speed change gear pairs 14 and 16 to transmit the power between the drive shafts 9 and 10 and the output shaft 12, and on the other hand, speed change gear pairs 15 and 17 are arranged to transmit the power between the drive shafts 9 and 10 and the output shaft 11. Each speed change gear pairs 14, 15, 16 and 17 comprises a drive gear 14a, 15a, 16a and 17a individually, and a driven gear 14b, 15b, 16b and 17b individually meshing with the drive gear 14a, 15a, 16a and 17a. Here, each ratio of teeth number between the drive gears 14a, 15a, 16a and 17a and the driven gear 14b, 15b, 16b and 17b is different from one another, in other words, gear ratios of the speed change gear pairs 14, 15, 16 and 17 are different from one another. That is, those speed change gear pairs 14, 15, 16 and 17 are adapted to set first to fourth gear stages (i.e., speed change ratios) individually, and the gear ratios of those gear pairs 14, 15, 16 and 17 are reduced in sequence.

Specifically, the drive gear 14a of the first gear pair 14 having the largest gear ratio, and the drive gear 16a of the third gear pair 16 having the third largest gear ratio are arranged on the idler shaft 13. On the other hand, the drive gear 15a of the second gear pair 15 having the second largest gear ratio, and the drive gear 17a of the fourth gear pair 17 having the smallest gear ratio are arranged on the first drive shaft 9. Here, the second drive shaft 10 is connected with the idler shaft 13 through a gear pair 18. Thus, the speed change gear pairs 14 and 16 for setting the odd gear stages are arranged to transmit the torque between one of the drive shafts 10 and one of the output shafts 12 (as will be tentatively called a "second output shaft"), and the speed change gear pairs 15 and 17 for setting the even gear stages are arranged to transmit the torque between the other drive shaft 9 and the other the output shaft 11 (as will be tentatively called a "first output shaft").

In this example, the rotational directions of the second drive shaft 10 and the second output shaft 12 are unified by the idler shaft 13, and the first drive shaft 9 and the first output shaft 11 are rotated in the opposite directions. However, the carrier Cr connected with the first drive shaft 9 and the sun gear Sn connected with the second drive shaft 10 are rotated in the opposite directions. As a result, the output shafts 11 and 12 are rotated in the same direction.

The speed change gear pairs 14, 15, 16 and 17 are adapted to transmit the torque selectively to their own output shaft 11 or 12. For this purpose, a clutch mechanism is arranged individually on a torque transmitting route via the speed change gear pair 14 or 16, and on a torque transmitting route via the speed change gear pair 15 or 17. The clutch mechanism may be adapted to connect the drive gear selectively with the drive shaft 9 or the idler shaft 13, to connect the driven gear selectively with the output shaft, or to connect the gear pair 18 selectively with the drive shaft 10 or the idler shaft 13. According to the example shown in FIG. 1, the clutch mechanism is adapted to connect the driven gear selectively with the output shaft.

Specifically, the second gear pair 15 and the fourth gear pair 17 correspond to the first speed change gear pair system of the present invention, and the drive gear 15a of the second gear pair 15 and the drive gear 17a of the fourth gear pair 17 are arranged on the first drive shaft 9 while being adjacent to each other. On the other hand, the driven gear 15b and the driven gear 17b meshing individually with the drive gears 15a and 17a are arranged on the first output shaft 11 in a rotatable manner, and a clutch S2 for setting the even gear stages are arranged between those driven gears 15b and 17b. For example, a frictional clutch, a dog clutch or the like can be used as the clutch S2, and the dog clutch is used in the example shown in FIG. 1. That is, the clutch S2 is structurally identical to the aforementioned lock clutch SL. Specifically, the clutch S2 comprises: a sleeve 20, which is splined to a hub 19 integrated with the first output shaft 11 in a manner to reciprocate in its axial direction; and a hub 21 integrated with the second driven gear 15b and a hub 22 integrated with the fourth driven gear 17b situated on both sides of the hub 19.

Therefore, the second driven gear 15b is connected with the first output shaft 11 through the sleeve 20 and the hub 19 by moving the sleeve 20 toward the second driven gear 15b side thereby splining the sleeve 20 with the hub 21. Likewise, the fourth driven gear 17b is connected with the first output shaft 11 through the sleeve 20 and the hub 19 by moving the sleeve 20 toward the fourth driven gear 17b side thereby splining the sleeve 20 with the hub 22.

Meanwhile, the first gear pair 14 and the third gear pair 16 correspond to the second speed change gear pair system of the present invention, and the drive gear 14a of the first gear pair 15 and the drive gear 16a of the third gear pair 16 are arranged on the idler shaft 13 while being adjacent to each other. On the other hand, the driven gear 14b and the driven gear 16b meshing individually with the drive gears 14a and 16a are arranged on the second output shaft 12 in a rotatable manner, and a clutch S1 for setting the odd gear stages are arranged between those driven gears 14b and 16b. For example, a frictional clutch, a dog clutch or the like can also be used as the clutch S1, and the dog clutch is used in the example shown in FIG. 1.

That is, the clutch S1 is structurally identical to the aforementioned lock clutch SL and the clutch S2. Specifically, the clutch S1 comprises: a sleeve 24, which is splined to a hub 23 integrated with the second output shaft 12 in a manner to reciprocate in its axial direction; and a hub 25 integrated with the first driven gear 14b and a hub 26 integrated with the third driven gear 16b situated on both sides of the hub 23. Therefore, the first driven gear 14b is connected with the second output shaft 12 through the sleeve 24 and the hub 23 by moving the sleeve 24 toward the first driven gear 14b side thereby fitting the sleeve 24 with the hub 25. Likewise, the third driven gear 16b is connected with the second output shaft 12 through the sleeve 24 and the hub 23 by moving the sleeve 24 toward the third driven gear 16b side thereby fitting the sleeve 24 with the hub 26.

A mechanism for reciprocating each sleeve 20 and 24 in its axial direction is not especially shown in FIG. 1. However, according to the example shown in FIG. 1, an actuator, which is adapted to be reciprocated by a thrust force such as an oil pressure, an electromotive force and so on, is employed to reciprocate the sleeves 20 and 24.

The output shaft 11 is connected with the differential 29 functioning as a final reduction mechanism through a counter gear 27, and the output shaft 12 is also connected with the differential 29 through a counter gear 28. The differential 29 is a known gear mechanism comprising: a differential casing integrated with the ring gear 30 meshing with the counter gears 27 and 28; a pinion gear arranged in the differential casing; and one pair of side gears meshing with the pinion gear (the elements listed above are not shown). An axle 31 for transmitting the torque to a (not shown) wheel is connected individually with each side gear. Thus, the power transmission unit shown in FIG. 1 is adapted to serve as a transaxle on the vehicle.

In addition, the power transmission unit shown in FIG. 1 is provided with an electronic control unit (ECU) 32 composed mainly of a microcomputer for controlling a driving mode, a speed change operation and so on by outputting a control command signal to the controller 4 and the actuators. For example, a drive demand such as an opening degree of an accelerator, a vehicle speed, a rotational speed of the engine, a current speed change ratio and so on are inputted to the electronic control unit 32, and the electronic control unit 32 carries out a calculation on the basis of the inputted data and the data stored in advance such as a speed change diagram (i.e., a speed change map). Then, the electronic control unit 32 outputs a control command signal in accordance with the calculation result.

Figures 2, 3:
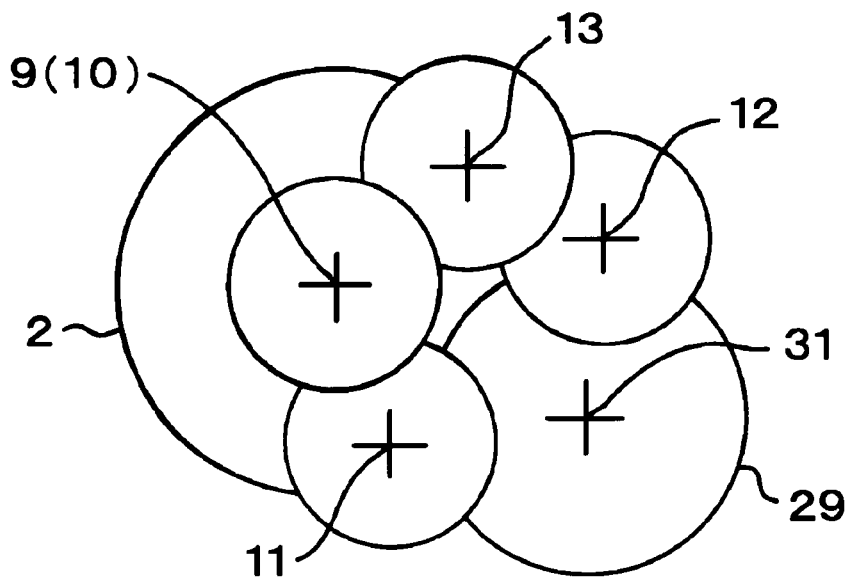
FIG. 2 is a view showing an arrangement of the axes in the example shown in FIG. 1.
FIG. 3 is a table showing a relation between gear stages and engagement states of the clutches.

Here will be explained an arrangement of the shafts in the power transmission unit. As described, the engine 2, the planetary gear mechanism 1, and the drive shafts 9 and 10 are arranged coaxially. The output shafts 11 and 12 for transmitting the power to the differential 29 are individually arranged in parallel with the drive shafts 9 and 10, and the idler shaft 13 is arranged between the drive shaft 10 and the output shaft 12. Thus, a total of five shafts are arranged in the example shown in FIG. 1. A cross section of the shafts thus arranged is shown in FIG. 2. As shown in FIG. 2, a rotation center of the differential 29 (i.e., the axle 31) is situated obliquely below a rotational center of the engine 2.

As also shown in FIG. 2, the idler shaft 13 and the second output shaft 12 are situated above a plane including the rotation center of the engine 2 and the rotation center of the differential 29, and the first output shaft 11 is situated below such plane. Thus, a number of the shafts situated below the rotational centers of the large members having a large external diameter such as the engine 2 and the differential 29 can be reduced. Therefore, a friction between the shaft and a road surface can be prevented or avoided.

According to the power transmission unit thus far explained, a predetermined gear stage is set by allowing any of the speed change gear pairs 14, 15, 16 and 17 to transmit the torque between the first drive shaft 9 or the second drive shaft 10 and the first output shaft 11 or the second output shaft 12 using any of the clutches S1 and S2, and by switching the drive shaft to transmit the torque of the engine 2 between the drive shafts 9 and 10 by the planetary gear mechanism 1. In addition, a rotational speed of the gear to be allowed to transmit the power by the action of the clutch S1 or the clutch S2 is synchronized with the rotational speed to be achieved after the speed change operation by the planetary gear mechanism 1 and the motor generator 3.

FIG. 3 is a table showing a relation between the gear stages set by connecting the engine 2 mechanically and directly with the output shaft 11 or 12, and engagement states of the clutches S1, S2 and SL under each gear stage. Circled numbers in FIG. 3 correspond individually to the circled numbers in FIG. 1, that is, the circled numbers represent the speed change gear pairs engaged with the sleeve 20 of the clutch S1 or the sleeve 24 of the clutch S2. In addition, "X" in FIG. 3 represents a state in which the clutch is disengaged, and "◯" represents a state in which the clutch is engaged thereby locking the motor generator 3.

Here will be explained an action of the power transmission unit shown in FIG. 1. In case of setting the first stage to start the vehicle, the engine 2 is started to be rotated, and the carrier Cr of the planetary gear mechanism 1 is thereby rotated in the forward direction. On the other hand, the motor generator 3 is rotated freely or in a manner not to allow the sun gear Sn to establish a reaction force by controlling the current being supplied thereto. As a result, the sun gear Sn functioning as an output element under the odd gear stages is kept halted, and the torque is therefore not transmitted. In this situation, the first driven gear 14b is connected with the second output shaft 12 by moving the sleeve 24 of the clutch S1 toward the first driven gear 14b side thereby engaging the sleeve 24 with the hub 25. Consequently, the first gear pair 14 is allowed to transmit the torque between the sun gear Sn as the third rotary element and the second output shaft 12 through the idler shaft 13. However, at this point, the torque has not acted on the sun gear Sn. Therefore, the second output shaft 12 will not be rotated and the vehicle on which the power transmission unit is mounted has not yet been moved.

Then, the current being supplied to the motor generator 3 is controlled to use the motor generator 3 as a generator. Consequently, a reaction force resulting from rotating the motor generator 3 compulsory acts on the ring gear Rg, and a rotational speed of the ring gear Rg is thereby lowered gradually. In this situation, the torque acts on the sun gear Sn functioning as an output element to rotate the sun gear Sn in the forward direction, and the rotational speed of the sun gear Sn is thereby raised gradually. The torque of the sun gear Sn is transmitted to the idler shaft 13 through the second drive shaft 10 and the gear pair 18, and further transmitted to the second output shaft 12 through the first drive gear 14a fitted onto the idler shaft 13, the first driven gear 14b meshing with the first drive gear 14a, and the clutch S1. As a result, the torque is outputted from the second output shaft 12 to both of the wheels 31 through the counter gear (Co) 28 and the differential 29.

During the process, the torque of the engine 2 is outputted to the second drive shaft 10 while being amplified, and the rotational speed of the second output shaft 12 is raised gradually even if the rotational speed of the engine 2 is constant. Therefore, the speed change ratio is decreased steplessly, in other words, reduced continuously. Thus, this is a function similar to that of a conventional torque converter being used widely in vehicles.

Figure 4:
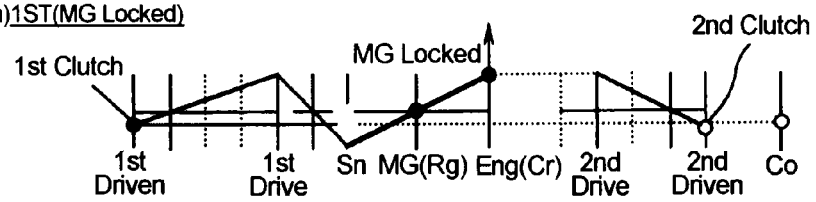
FIG. 4 is a nomographic diagram explaining operating states of the example shown in FIG. 1 in the process of an upshifting from the situation in which the vehicle is stopping to a situation in which the third stage is set while carrying out a synchronous control.
Figure 4:
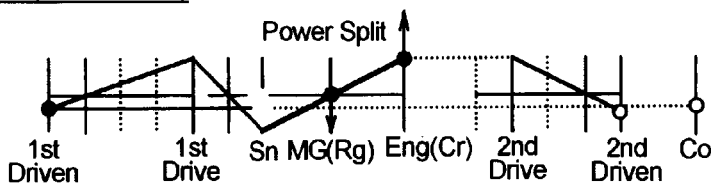
Figure 4:
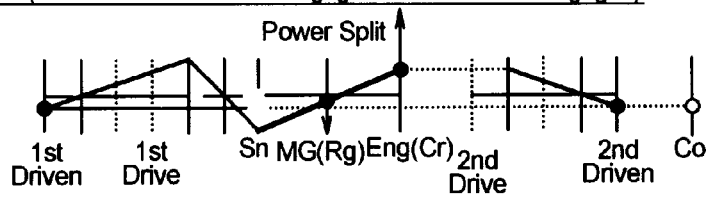
Figure 4:
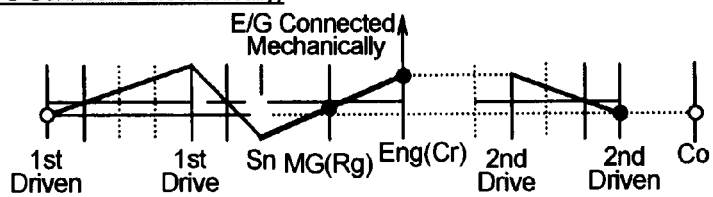
Figure 4:
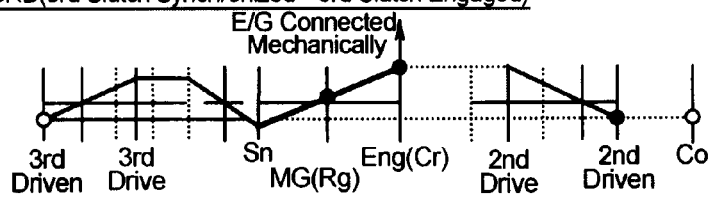
Figure 4:
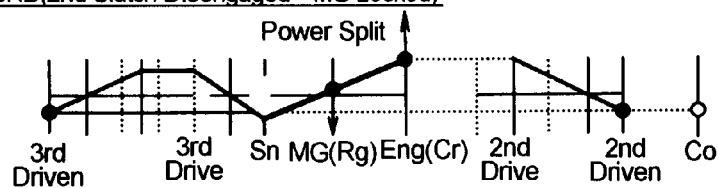
Figure 4:
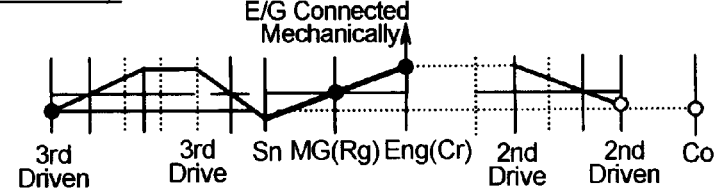

When the rotations of the motor generator 3 and the ring gear Rg which have been reduced gradually are substantially halted, the lock clutch SL being disengaged is engaged. Specifically, the sleeve 7 of the lock clutch SL is moved to the right side of FIG. 1 to be engaged with the hub 8, and the motor generator 3 and the ring gear Rg connected therewith are thereby locked. This situation is shown in FIG. 4 (a).

Specifically, in the planetary gear 1, the torque is inputted to the carrier Cr from the engine 2 and the carrier Cr is thereby rotated in the forward direction. However, the ring gear Rg is locked in this situation, therefore, the sun gear Sn as the output element is rotated in the direction opposite to the rotational direction of the engine 2 or the carrier Cr. In other words, the sun gear Sn is rotated backwardly. As described, the second drive shaft 10 on which the sun gear Sn is arranged and the idler shaft 13 on which the first drive gear 14a is arranged are connected through the gear pair 18. Therefore, the first drive gear 14a is rotated in the forward direction. In this situation, the first driven gear 14b meshing with the first drive gear 14a and the second output shaft 12 connected with the first driven gear 14b are rotated backwardly, and the torque is outputted from the second output shaft 12 to the differential 29 though the counter gear 28 and the ring gear 30 meshing therewith. Those elements are thus rotated in the directions as explained above in case of driving the vehicle in the forward direction.

Here, since the power of the engine 2 is transmitted directly to the first drive shaft 9 through the carrier Cr, the first drive shaft 9 is rotated in the forward direction, and the torque of the first drive shaft 9 is transmitted to the second driven gear 15b through the second drive gear 15a. Therefore, the second driven gear 15b is rotated backwardly. In other words, the second driven gear 15b is rotated in the direction to drive the vehicle in the forward direction, as the first driven gear 14b.

Therefore, under the first stage, the power outputted from the engine 2 is transmitted to the second drive shaft 10 through the planetary gear mechanism 1, and the rotational speed established by the power of the engine 2 is reduced by the planetary gear mechanism 1. The power transmitted to the second drive shaft 10 is outputted to the second output shaft 12 through the gear pair 18, the first gear pair 14, and the clutch S1. Thus, in case of setting the first stage, the power is transmitted only by the mechanical means, that is, the first stage is set by connecting the elements a mechanically and directly. In this case, the motor generator 3 is not being involved in the power transmission, that is, the motor generator 3 is locked so that the electric power will not be consumed and the mechanical power will not be converted into the electric power. Moreover, energy efficiency can be improved by avoiding a power loss resulting from rotating the motor generator 3 unnecessarily.

As described, the first drive shaft 9 outputting the power under the even gear stages is connected with the engine 2 through the carrier Cr, therefore, the first drive shaft 9 as well as the speed change gear pairs 15 and 17 for setting the even gear stages arranged thereon are rotated even under the first stage as the odd stage. Under the first stage, the rotational speed of the second driven gear 15b and the rotational speed of the first output shaft 11 are different from each other. Therefore, in case of upshifting to the second stage, a synchronous control is carried out to synchronize those rotational speeds.

Specifically, in case a judgment to carry out an upshifting is satisfied, the motor generator 3 and the ring gear Rg connected therewith are halted by using the motor generator 3 as a generator to generate a negative torque. In this situation, the lock clutch SL is disengaged. Then, the rotational speed of the motor generator 3 is lowered by increasing the negative torque being established by the motor generator 3 itself. In this case, the engine torque is controlled in a manner not to vary the torque of the output shaft 12. The control amount of the engine torque can be calculated by a widely known conventional way, for example, on the basis of the torque of the motor generator 3, a gear ratio of the planetary gear mechanism 1 (i.e., a ratio between the teeth number of the sun gear Sn and the teeth number of the ring gear Rg) and so on.

A transitional state of the upshifting operation, in which the rotational speed of the motor generator 3 is lowered by increasing the negative torque thereof is shown in FIG. 4 (b). As shown in FIG. 4 (b), the rotational speed of the engine 2 is lowered toward the rotational speed thereof to be achieved under the second stage, while increasing the negative torque being established by the motor generator 3 to keep the rotational speeds and the torques of the ring gear Rg and the output shaft 13, or driving the motor generator 3 as a motor to lower the rotational speed of the motor generator 3. As described, the drive gear 15a of the second gear pair 15 is connected with the engine 2 through the first drive shaft 9 and the carrier Cr. Therefore, the rotational speed of the second drive gear 15a and the rotational speed of the second driven gear 15b meshing therewith are lowered by lowering the rotational speed of the engine 2. As a result, the rotational speed of the second driven gear 15b is synchronized with the rotational speed of the output shaft as shown in FIG. 4 (c). That is, the synchronous control is completed.

When the synchronous control is completed, the second driven gear 15b is connected with the first output shaft 11 by moving the sleeve 20 of the clutch S2 toward the second gear pair 15 side thereby engaging the sleeve 20 with the hub 21 of the driven gear 15b. As a result, the second gear pair 15 is allowed to transmit the torque between the carrier Cr and the first output shaft 11. At the same time, the clutch S1 is disengaged to disconnect the first driven gear 14b from the second output shaft 12. Therefore, the rotational speed will not be varied even if the second gear pair 15 is connected with the first output shaft 11 by the clutch C2. For this reason, a shift shock will not be caused by an inertia force. In addition, when the clutch S1 is disengaged, the clutch S2 is being engaged and transmitting the torque to the first output shaft 11. Therefore, the torque can be transmitted constantly to the differential 29 and to the axle 31 even during the speed change operation. For this reason, an occurrence of the shift shock can be prevented, and the torque will not idle away during the speed change operation. Thus, the driver can be prevented from feeling such uncomfortable feeling.

Under the second stage, the power of the engine 2 is transmitted to the first drive shaft 9 as it is, and further transmitted to the first output shaft 11 through the second gear pair 15 and the clutch S2. That is, the second stage is a directly connected stage in which the power of the engine 2 is transmitted directly to the first output shaft 11 by a mechanical means, as shown in FIG. 4 (d). Under the second stage, the motor generator 3 is not necessarily to be used and therefore not especially driven (i.e., turned OFF). In this case, the motor generator 3 is rotated backwardly, however, the rotational speed thereof is low as shown in FIG. 4 (*d*). Therefore, a "drag loss" resulting from rotating the motor generator 3 concurrently can be minimized, and the fuel economy of the vehicle is thereby improved.

Next, an upshifting operation from the second stage to the third stage will be explained hereinafter. After carrying out such an upshifting, that is, under the third stage, the torque is to be transmitted to the third driven gear 16*b*. Therefore, in case of carrying out the upshifting from the second stage to the third stage, the rotational speed of the third driven gear 16*b* is synchronized with the rotational speed of the second output shaft 12. Specifically, in case the motor generator 3 is unlocked under the second stage, the third driven gear 16*b* is rotated backwardly at the speed higher than the rotational speed of the second output shaft 12. Therefore, in order to synchronize the rotational speed of the third driven gear 16*b* with the rotational speed of the second output shaft 12, the motor generator 3 is rotated in the forward direction as shown in FIG. 4 (*e*).

That is, in the beginning of such synchronous control, the motor generator 3 is used as a generator to lower the rotational speed thereof in the backward direction. Then, after the rotation of the motor generator 3 stops, the motor generator 3 is driven as a motor to output the torque in the forward direction. In this case, the torque of the engine 2 is also controlled in order not to vary the output shaft torque, as in the case of the synchronous control during the speed change operation from the first stage to the second stage. A relation between those torques can be calculated easily on the basis of the gear ratio of the planetary gear mechanism 1, or the gear ratio of the speed change gear pair transmitting the torque.

As a result of thus varying the rotational speeds of the motor generator 3 and the ring gear Rg connected therewith, the rotational speed of the sun gear Sn is lowered. Therefore, the rotational speed of the third gear pair 16 connected with the sun gear Sn through the second drive shaft 10, the gear pair 18, and the idler shaft 13 is lowered. The rotational speed of the sun gear Sn and the rotational speed of the third gear pair 16 to which the torque is transmitted from the sun gear Sn are governed by the gear ratio of the planetary gear mechanism 1, the rotational speed of the motor generator 3, and the gear ratio of the third gear pair 16. Therefore, the rotational speed of the motor generator 3 required to synchronize the rotational speed of the third driven gear 16*b* with the rotational speed of the second output shaft 12 can be calculated and controlled easily.

When the rotational speed of the third driven gear 16*b* is synchronized with the rotational speed of the second output shaft 12, the third driven gear 16*b* is connected with the second output shaft 12 by moving the sleeve 24 of the clutch S1 toward the third driven gear 16*b* side thereby engaging the sleeve 24 with the spline 26 of the third driven gear 16*b*. Meanwhile, the sleeve 20 of the clutch S2 is moved away from the second driven gear 15*b* thereby disengaging the clutch S2, and as a result, the second driven gear 15*b* is disconnected from the first output shaft 11. In addition, rotations of the motor generator 3 and the ring gear Rg are halted by engaging the lock clutch SL. Those procedures are shown in FIGS. 4 (*f*) and 4 (*g*). Here, in FIG. 4, the black circle (●) represents that the element is connected in a manner to transmit the torque, and the white circles (○) represents that the element is not connected and therefore not transmitting the torque. In addition, the arrow represents a direction of the torque.

An upshifting from the third stage to the fourth stage is a speed change operation from the odd gear stage to the even gear stage. Therefore, the synchronous control is carried out in the same way as carrying out the speed change operation from the first stage to the second stage. Meanwhile, in case of carrying out a downshifting, the synchronous control and the switching operation of the clutches are carried out in the reverse order.

In the power transmission unit thus has been explained, all of the gear pairs are not arranged in line in the axial direction. Specifically, one of the group of the speed change gear pair for setting the odd stages, and the group of the speed change gear pair for setting the even stages are arranged in the axial direction, and the other group of the speed change gear pairs is arranged in the radial direction. Therefore, the total length of the power transmission unit can be shortened. Moreover, since the power transmission routes are formed using parallel gears capable of shortening a distance between the shafts, the outer diameter of the power transmission unit will not be enlarged. Furthermore, as shown in FIG. 1, the ring gear Rg as the reaction element or the fixing element is arranged to be situated between the carrier Cr as the input element and the sun gear Sn as the output element in a nomographic diagram of the planetary gear mechanism 1 functioning as a differential, and the motor generator 3 is connected to the ring gear Rg. Therefore, the rotational speed of the motor generator 3 can be kept to a low speed in any of the gear stages.

Therefore, the required output of the motor generator 3 is rather small in either case of using the motor generator 3 as a motor or using the motor generator 3 as a generator. For this reason, the motor generator can be downsized entirely. Moreover, although the motor generator 3 is operated during the speed change operation, the vehicle can be driven only by the power of the engine 2 under each gear stage. Therefore, the fuel economy of the vehicle can be improved.

Figure 5:
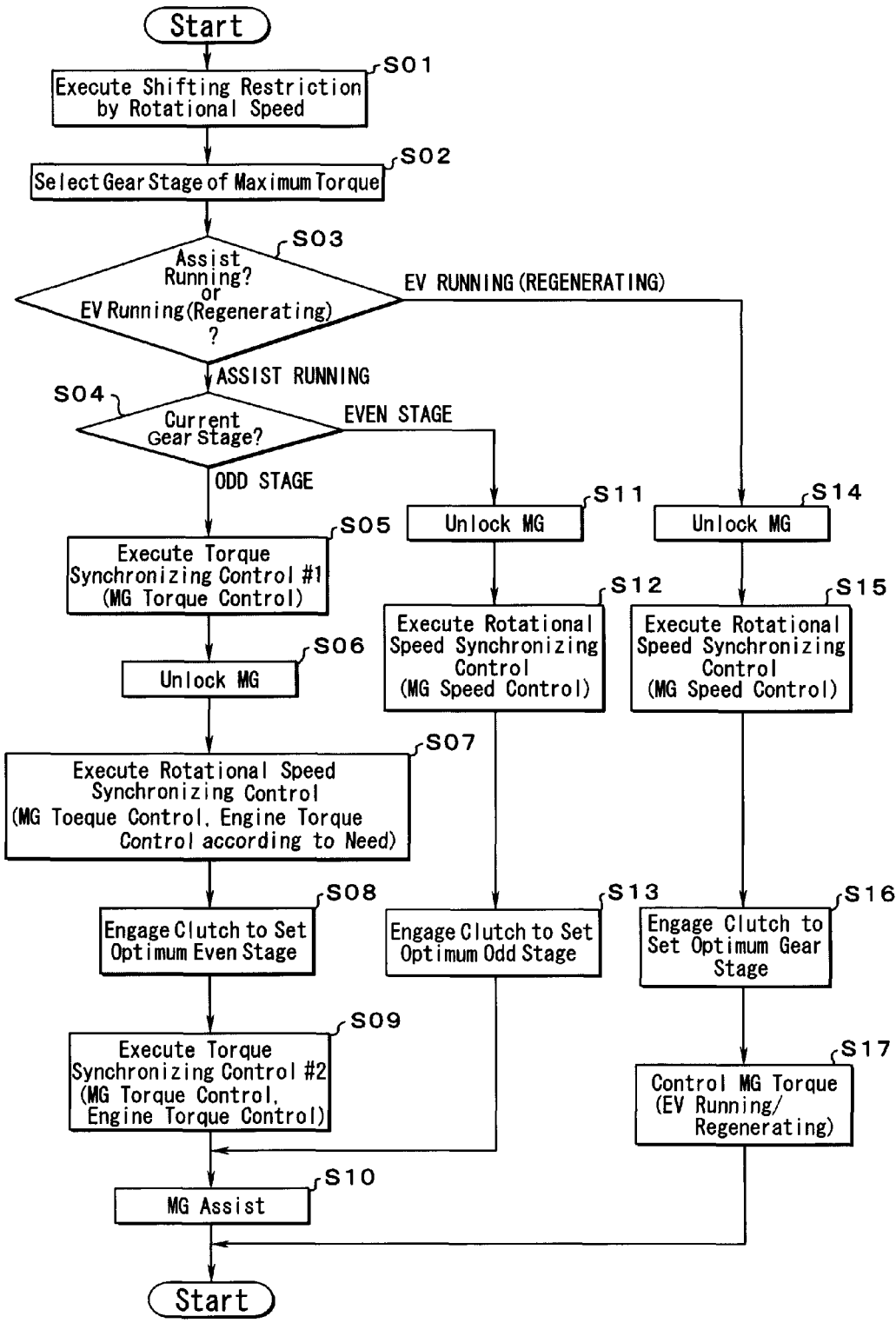
FIG. 5 is a flowchart explaining on example of a speed change control according to the present invention.

As explained above, according to the power transmission unit of the present invention, both of the engine 2 and the motor generator 3 are connected with the planetary gear mechanism 1. In addition, under the odd stages, the torque is outputted to the second drive shaft 10 in the direction opposite to the torque of the engine 2, and under the even stage, the torque of the engine 2 is outputted to the first drive shaft 9 as it is. Therefore, in order to obtain sufficient torque, and in order to improve the fuel economy, the following control is carried out in case of using the motor generator 3 as a motor or in case of using the motor generator 3 as a generator. FIG. 5 is a flowchart explaining such a control, and the control shown in FIG. 5 is carried out mainly by the aforementioned electronic control unit 32 in case of operating the motor generator 3.

As shown in FIG. 5, first of all, a shifting restriction based on the rotational speed of the motor generator 3 is carried out (at step S01). As described, the motor generator 3 is connected with the ring gear Rg of the planetary gear mechanism 1. Therefore, the rotational speed of the motor generator 3 is raised to the high speed depending on the rotational speeds of the engine 2 connected with the carrier Cr and the sun gear Sn which outputs the torque under the odd gear stages. However, the rotational speed of the motor generator 3 has to be limited according to a structural factor thereof such as a mechanical strength, durability, controllability and so on. Therefore, the rotational speed of the motor generator 3 is restricted at step S01.

Then, a gear stage, in which an output torque To (i.e., the torque acts on the differential 29) becomes maximum when the motor generator 3 is driven within the restriction of the rotational speed thereof, is selected (at step S02). Specifically, in case of assisting the torque by the motor generator 3 or regenerating the energy by the motor generator 3 under the even gear stage, the speed change gear pair for setting the odd gear stage of the high speed side, that is, the third gear pair of the example shown in FIG. 1 is enabled to transmit the torque by the clutch S1. To the contrary, in case of assisting the torque by the motor generator 3 or regenerating the energy by the motor generator 3 under the odd gear stage, the speed change gear pair for setting the even stage of the low speed side, that is, the second gear pair of the example shown in FIG. 1 is enabled to transmit the torque by the clutch S2.

More specifically, the torque M of the sun gear Sn, and the torque Tc of the carrier Cr of the planetary gear mechanism 1 shown in FIG. 1 are expressed by the following formulas:

$$Ts = \rho \cdot Tm, \text{ and}$$

$$Tc = (1-\rho) \cdot Tm.$$

Here, in the above expressions, Tm represents the torque of the motor generator 3, and $\rho$ represents the gear ratio of the planetary gear mechanism 1. On the other hand, the output torque To is expressed by the following formula:

$$To = Te \times G2 + Tc \times G2 - Ts \times G1.$$

Here, in the above expression, G1 represents the gear ratio under the odd stage, G2 represents the gear ratio under the even stage, and Te represents the torque of the engine 2. Therefore, the output torque To can be obtained by substituting the expressions of the sun gear Sn and the carrier Cr into the above formula, as expressed below:

$$To = G2 \times Te + \{(1-\rho)G2 - \rho G1\} \times Tm.$$

Accordingly, in case of driving the vehicle by driving the motor generator 3 in addition to the engine 2, the gear stage is selected to reduce G1 under the even gear stage, or to increase G2 under the odd gear stage. The functional means thus selecting the gear stage corresponds to the gear stage selecting means of the present invention.

Then, it is judged whether the driving mode or running mode of the vehicle is an assist running or an EV running (at step S03). Here, the assist running is the driving mode or the running mode in which the vehicle is driven mainly by the torque of the engine 2, and the driving torque is assisted by the output torque of the motor generator 3. On the other hand, the EV running is the driving mode or the running mode in which the vehicle is driven only by the power of the motor generator 3, and the energy is regenerated by the motor generator 3. The judgment at step S03 can be made on the basis of the control states of the engine 2 and the motor generator 3, a control signal, vehicle speed and so on.

In case the driving mode of the vehicle is judged as the assist running at step S03, then, it is judged whether or not the current gear stage is the odd gear stage (at step S04). Specifically, it is judged whether or not the current gear stage is a gear stage set by utilizing a differential action of the planetary gear mechanism 1 as the differential mechanism, or the current gear stage is a gear stage set by locking the motor generator 3.

In case the current gear stage is the odd gear stage, a torque synchronizing control #1 (i.e., the first torque synchronizing control) is carried out to commence a shifting operation (at step S05). That is, at step S05, the motor generator is controlled to receive the torque halting the motor generator 3 by itself, which has been received by the casing or the like through the lock clutch SL. Specifically, according to the example shown in FIG. 1, the torque being generated by the motor generator 3 in the backward direction is balanced with the torque acting on the motor generator 3 from outside, by gradually increasing the torque generated by the motor generator 3 in the backward direction. The torque acting on the motor generator 3 can be calculated easily on the basis of the output torque of the engine 2, the gear ratio of the planetary gear mechanism 1 and so on using the above formula.

When the torque acting on the motor generator 3 from outside is balanced out by the torque of the motor generator 3 itself, the motor generator 3 being locked is unlocked (at step S06). Specifically, the sleeve 7 of the lock clutch SL is moved toward the left side in FIG. 1 to be disengaged from the hub 8 integrated with the rotor of the motor generator 3, because the motor generator 3 can be halted by the output torque thereof. Then, after the motor generator 3 is thus released, a rotational speed synchronizing control is carried out by varying the rotational speed of the motor generator 3 (at step S07).

Specifically, as explained with reference to FIG. 4, the rotational speed of the motor generator 3 is varied to synchronize the rotational speeds of the sleeve 20 of the clutch S2 and the hub 21 or 22 to be engaged with the sleeve 20. In this case, the output torque of the motor generator 3 may be varied and the inertia torque may be generated. Therefore, in order to minimize such fluctuation of the output torque and the drive torque, it is preferable to control the engine torque according to need.

When those rotational speeds are synchronized, a shifting operation to the gear stage (i.e., to an optimum even stage) selected at step S02 is carried out (at step S08). Specifically, the sleeve 20 of the clutch S2 the rotational speed thereof has been synchronized with that of the hub 21 or 22 is fitted with the hub 21 or 22. As described, the output torque To of the case of assisting the torque by the motor generator 3 is expressed by the above formula. Therefore, after setting the optimum even gear stage at step S08, a torque control of the motor generator 3 and a torque control of the engine 2 are carried out to synchronize the output torque with the output torque to be achieved under the optimum even stage (at Step S09). That is, a torque synchronizing control #2 (i.e., the second torque synchronizing control) is carried out. After thus synchronizing the output torque, the torque assist by the motor generator 3 is carried out (at step S10). Then the routine is returned to START.

In case the current gear stage is judged as the even gear stage at step S04, the following controls are to be carried out. As described, the engine 2 is connected directly with the speed change gear pair under the odd gear stage. That is, it is unnecessary to carry out a torque synchronizing control when setting the optimum odd gear stage for the purpose of assisting the torque by the motor generator 3. Therefore, in case the current gear stage is judged as the even gear stage at step S04, the motor generator 3 being locked is unlocked first of all (at step S11), as the aforementioned step S06.

Then, a rotational speed synchronizing control is carried out by controlling the rotational speed of the motor generator 3 (at step S12). In this case, the drive torque is kept by the torque of the engine 2 so that the drive torque is not varied even if the rotational speed of the motor generator 3 is varied. Therefore, it is unnecessary to control the engine torque. Specifically, at step S12, the rotational speed of the motor generator 3 is varied to synchronize the rotational speeds of the sleeve 24 of the clutch S1 and the hub 25 or 26 to be fitted with the sleeve 24.

Then, when those rotational speeds are synchronized, a shifting operation to the gear stage (i.e., to an optimum odd gear stage) selected at step S02 is carried out (at step S13). Specifically, the sleeve 24 of the clutch S1 the rotational speed thereof has been synchronized with that of the hub 25 or 26 is splined to the hub 25 or 26. After thus synchronizing the rotational speeds, the torque assist by the motor generator 3 is carried out (at step S10). Then the routine is returned to START.

In case the driving mode of the vehicle is judged as the EV running (including a drive mode in which regeneration of the energy is carried out by the motor generator 3) at step S03, the motor generator 3 being locked is unlocked to be driven (at step S14). Then, the rotational speed synchronizing control is carried out (at step S15). The controls to be carried out at steps S14 and 15 are identical to those carried out at the aforementioned steps S11 and 12.

Then, the clutch S1 or the clutch S2 is engaged to set an optimum gear stage (at step S16). The optimum gear stage can be set on the basis of a drive demand of the driver, a vehicle speed, a speed change map and so on. After engaging any of the clutches 51 and S2 thereby setting the optimum gear stage, the motor generator 3 is driven as a motor, or a regeneration of energy is carried out using the motor generator 3 (at step S17). Then the routine is returned to START.

Figure 6:
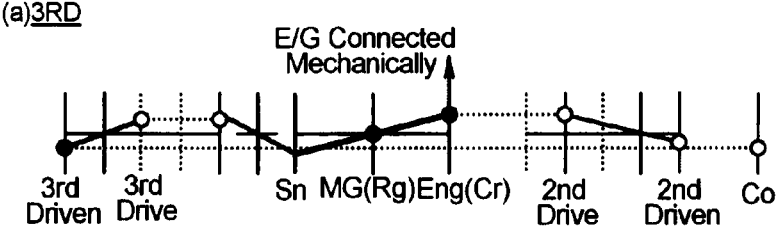
FIG. 6 is a nomographic diagram explaining changes in the behavior in case of carrying out the synchronous control and the rotational speed synchronizing control when assisting the torque under odd gear stages.
Figure 6:
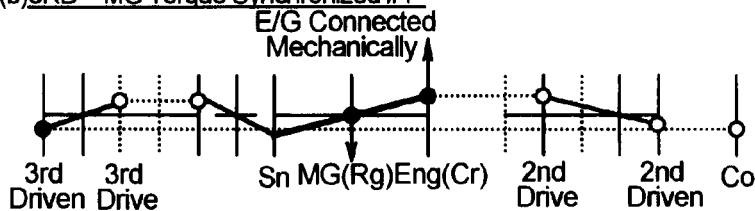
Figure 6:
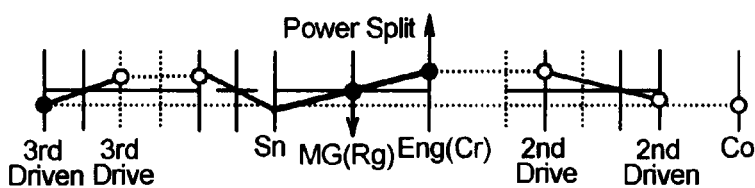
Figure 6:
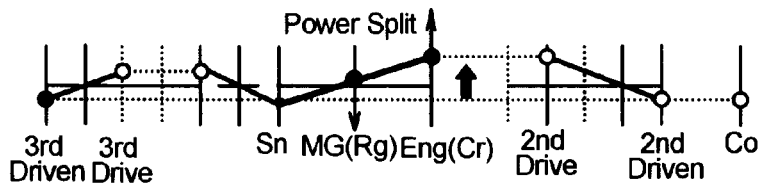
Figure 6:
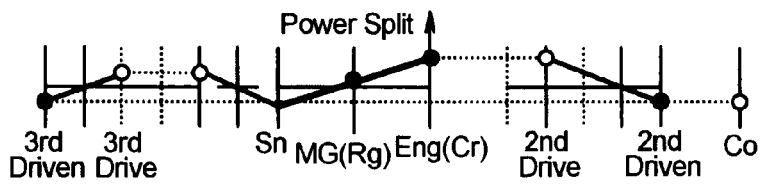
Figure 6:
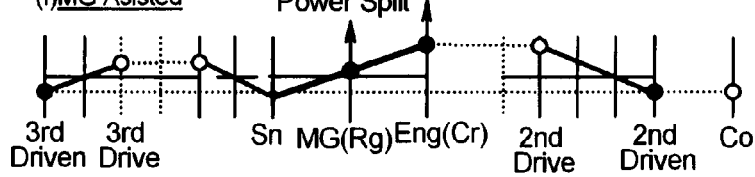

Here will be explained a control example of steps S05 to S10 with reference to the nomographic diagrams shown in FIG. 6. Specifically, a control example of carrying out a torque assist by the motor generator 3 in case the vehicle is driven by the power of the engine 2 under the third stage will be explained hereinafter. As shown in FIG. 6 (a), under the third stage, the motor generator 3 and the ring gear connected therewith are halted (i.e., locked), and the engine 2 and the carrier Cr connected therewith are rotated in the forward direction. Therefore, the torque according to the rotation of the carrier Cr appears on the sun gear Sn, and the sun gear Sn is thereby rotated backwardly. The torque of the sun gear Sn is outputted from the second output shaft 12 through the idler shaft 13 and the third gear pair 16.

In case of carrying out the first torque synchronizing control (i.e., the torque synchronizing control #1), the motor generator 3 is driven as a motor to generate a torque in the backward direction (i.e., downwardly in FIG. 6), as shown in FIG. 6 (b). The torque of the motor generator 3 in the backward direction is increased gradually, and when the torque originated from the engine torque being applied to the motor generator 3 externally is balanced out by the torque of the motor generator 3 in the backward direction, the motor generator 3 being locked is unlocked. That is, the motor generator 3 is halted by itself instead of being halted by the fixing member such as the casing or the like. In FIG. 6, this situation is called as a "power split".

Then, the rotational speed synchronizing control is carried out by driving the motor generator 3 in the forward direction while increasing the rotational speed thereof. When the rotational speed of the motor generator 3 is increased, the rotational speeds of the engine 2 and the carrier Cr connected therewith are increased. As a result, the rotational speed of the driven gear 15b of the second gear pair 15 connected with the carrier Cr through the first drive shaft 9 is increased in the backward direction to be synchronized with the rotational speed of the first output shaft 11, as shown in FIG. 6 (d). In this situation, the second driven gear 15b is connected with the first output shaft 11 by the clutch S2 but the rotational speed will not be varied and a shift shock will be prevented as explained above.

After enabling the second gear pair 15 to transmit the torque by the clutch S2, the torque of the motor generator 3 and the torque of the engine 2 are synchronized by controlling those torques (as shown in FIG. 6 (e)), and then, the torque assist by the motor generator 3 is carried out (as shown in FIG. 6 (f)).

Thus, according to the power transmission unit of the present invention, the control contents for setting the gear stage is altered depending on the driving mode such as the assist running mode and the EV running mode. Accordingly, the functional means for altering the control contents to set the gear stage depending on the driving mode or the running mode corresponds to the speed change control altering means of the present invention. Meanwhile, the functional means for carrying out the controls of the steps S07, S12 and S15 in FIG. 5, that is, the means for synchronizing the rotational speeds of the members to be connected to enable the speed change gear pair to transmit the torque to the output shaft 11 or 12 corresponds to the synchronizing means of the present invention. Further, the functional means for controlling the torques of the engine 2 and the motor generator 3 cooperatively in case of synchronizing the torques at step S09 in FIG. 5 corresponds to the cooperative control means of the present invention.

The power transmission unit of the present invention is capable of selectively halting the second prime mover such as the motor generator connected with any one of the rotary elements of the differential mechanism. Therefore, the differential mechanism can be used as a speed reducing mechanism by halting any one of the rotary elements thereof through the second prime mover. For this reason, any of the speed change gear pairs can be used commonly to set a gear stage in which the differential mechanism functions as the speed reducing mechanism, and to set a gear stage in which the differential mechanism does not function as the speed reducing mechanism. An example thereof will be explained hereinafter.

Figure 7:
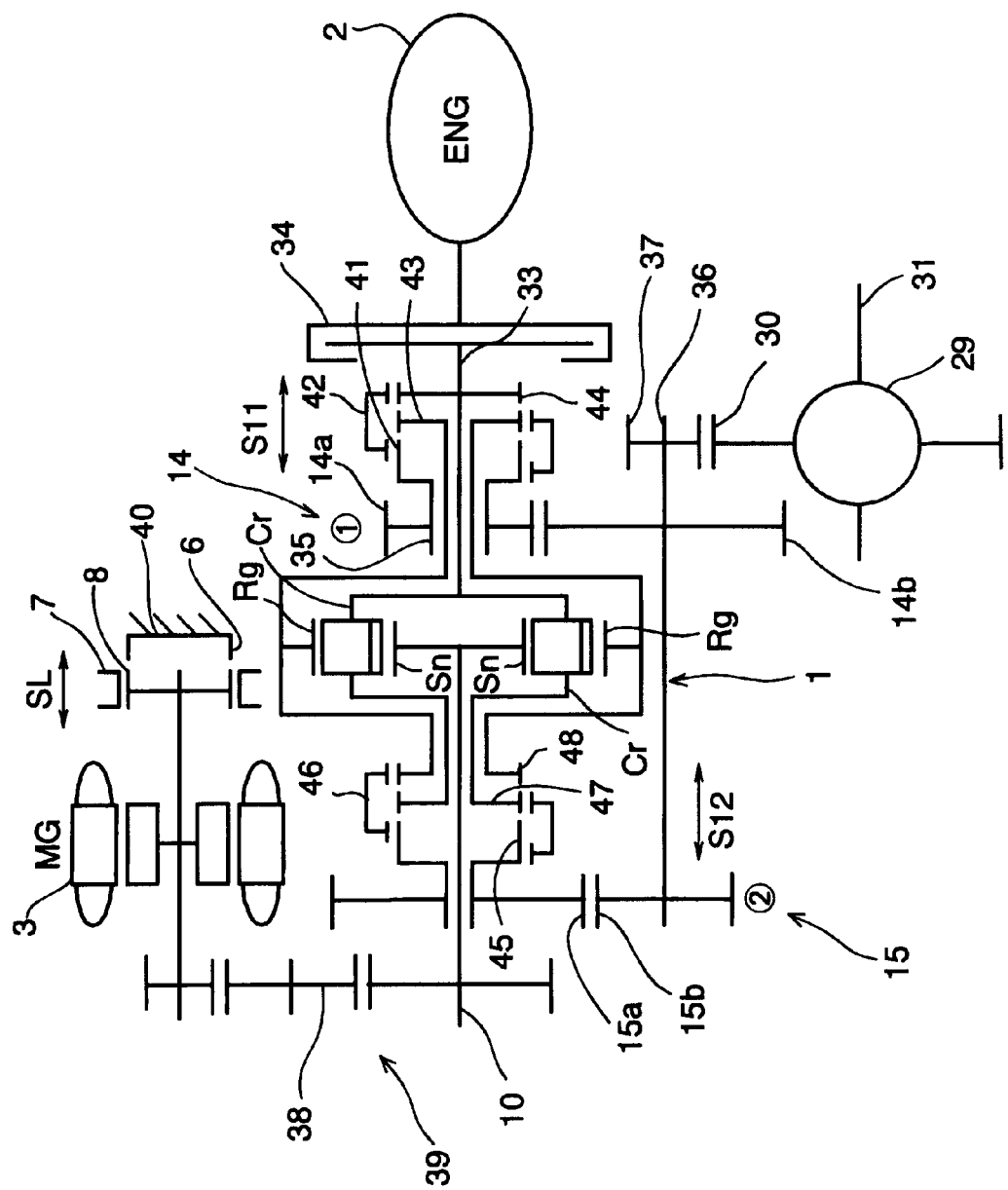
FIG. 7 is skeleton diagram showing another example of a power transmission unit according to the present invention.

FIG. 7 is a skeleton diagram showing an example of the power transmission unit capable of setting four forward stages by using the speed change gear pairs 14 and 15 to set two stages each. Specifically, as shown in FIG. 7, the engine 2 and the double pinion type planetary gear mechanism 1 are arranged coaxially. In this example, the first gear pair 14 for setting the odd gear stages and the clutch S11 for setting the odd stages are arranged between the engine 2 and the planetary gear mechanism 1, and the second gear pair 15 for setting the odd gear stages and the clutch S12 for setting the odd gear stages are arranged on the opposite side in the axial direction across the planetary gear mechanism 1.

The carrier Cr of the planetary gear mechanism 1 is connected with an input shaft 33 extending toward the engine 2, and a starting clutch 34 is arranged between the input shaft 33 and the engine 2. In short, the starting clutch 34 is a mechanism adapted to transmit and interrupt the torque selectively, and a conventional frictional clutch, such as a positive clutch and so on can be used as the starting clutch 34. A ring gear shaft 35 connected with the ring gear Rg of the planetary gear mechanism 1 is fitted onto the input shaft 33 in a rotatable manner, and the first drive gear 14a is held on an outer circumferential side of the ring gear shaft 35 in a rotatable manner.

The second drive shaft 10 integrated with the sun gear Sn of the planetary gear mechanism 1 extends along with the rotational axis of the planetary gear mechanism 1 in the direction away from the engine 2, and the second drive gear 15a is held an outer circumferential side of the second drive shaft 10 in a rotatable manner. An output shaft 36 is arranged outside of the planetary gear mechanism 1 in parallel therewith, and the first driven gear 14b meshing with the first drive gear 14a and the second driven gear 15b meshing with the second drive gear 15a are arranged on the output shaft 36. In addition, the counter gear 37 is arranged on the output shaft 36 at an end portion of the output shaft 36 of the engine 2 side to be engaged with the ring gear 30 of the differential 29.

According to the example shown in FIG. 7, the motor generator 3 corresponding to the second prime mover is arranged outside of the planetary gear mechanism, and the rotor of the motor generator 3 is connected with the second drive shaft 10 through a gear pair 39 including an idle gear 38. In order to halt (or lock) the motor generator 3 selectively, the lock clutch SL is arranged between the motor generator 3 and a predetermined fixing member 40 such as a casing. The lock clutch SL comprises a sleeve 7 splined to a hub 8 integrated with the rotor, and a fixed hub 6 integrated with the fixing member 40. Therefore, the motor generator 3 is locked by moving the sleeve 7 toward the fixed hub 6 thereby splining the sleeve 7 to the fixed hub 6.

The clutch S11 is adapted to connect the first drive gear 14a selectively with the ring gear Rg, with both of the carrier Cr and the ring gear Rg, or with the carrier Cr, and to disconnect the first drive gear 14a from those rotary elements of the planetary gear mechanism 1. The clutch S12 is also adapted to connect the second drive gear 15a selectively with the ring gear Rg, with both of the carrier Cr and the ring gear Rg, or with the carrier Cr, and to disconnect the second drive gear 15a from those rotary elements of the planetary gear mechanism 1.

Specifically, the clutch S11 is arranged between the first drive gear 14a and the starting clutch 34 coaxially with the planetary gear mechanism 1, and the clutch S11 comprises: a hub 41, which is integrated with the first drive gear 14a; a sleeve 42, which is splined to the hub 41 in a manner to move in the axial direction; a hub 43, which is integrated with the ring gear shaft 35 and which is to be splined to the sleeve 42; and a hub 44, which is integrated with the input shaft 33 and which is to be splined to the sleeve 42. The sleeve 42 is shifted in its axial direction by a not shown actuator among three positions to be engaged with the rotary elements.

Figure 8:
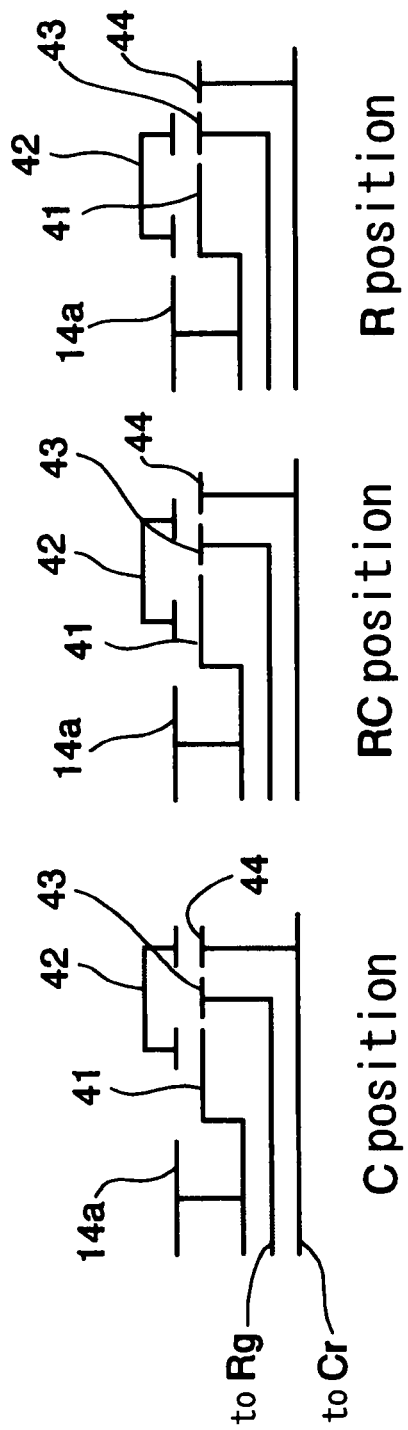
FIG. 8 is a view schematically showing engagement positions of the clutches for setting the odd gear stages.

The engagement positions of the clutch S11 are shown in FIG. 8 more specifically. As shown in FIG. 8, the hub 41 integrated with the first drive gear 14a, the hub 43 integrated with the ring gear shaft 35, and the hub 44 integrated with the input shaft 33 are aligned in this order. In case the sleeve 42 is shifted to a position to be splined to the hub 41 and the hub 44 across the hub 43 (as will be tentatively called "C position" hereinafter), the first drive gear 14a integrated with the hub 41 is connected with the carrier Cr or the engine 2. In case the sleeve 42 is shifted to a position to be splined to the hubs 41, 43 and 44 simultaneously (as will be tentatively called "RC position" hereinafter), the planetary gear mechanism 1 is integrated entirely and the first drive gear 14a is connected with the integrated planetary gear mechanism 1. In case the sleeve 42 is shifted to a position to be splined to the hub 41 and the hub 43 (as will be tentatively called "R position" hereinafter), the first drive gear 14a is connected with the ring gear Rg.

On the other hand, the clutch S12 is arranged between the second drive gear 15a and the planetary gear mechanism 1 coaxially with the second output shaft 10, and the clutch S12 comprises: a hub 45, which is integrated with the second drive gear 15a; a sleeve 46, which is splined to the hub 45 in a manner to move in the axial direction; a hub 47, which is integrated with the carrier Cr and which is to be splined to the sleeve 46; and a hub 48, which is integrated with the ring gear Rg and which is to be splined to the sleeve 46. The sleeve 46 is shifted in its axial direction by a not shown actuator among three positions to be engaged with the rotary elements.

The engagement positions of the clutch S12 are similar to those of the clutch S11. Specifically, the hub 45 integrated with the second drive gear 15a, the hub 47 integrated with the carrier Cr, and the hub 48 integrated with the ring gear Rg are aligned in this order. In case the sleeve 46 is moved to a position to be splined to the hub 45 and the hub 48 across the hub 47 (as will be tentatively called "R position" hereinafter), the second drive gear 15a integrated with the hub 45 is connected with the ring gear Rg. In case the sleeve 46 is moved to a position to be splined to the hubs 45, 47 and 48 simultaneously (as will be tentatively called "RC position" hereinafter), the planetary gear mechanism 1 is integrated entirely and the second drive gear 15a is connected with the integrated planetary gear mechanism 1. In case the sleeve 46 is moved to a position to be splined to the hub 45 and the hub 47 (as will be tentatively called "C position" hereinafter), the second drive gear 15a is connected with the carrier Cr or the engine 2.

In addition, although not especially shown, the power transmission unit shown in FIG. 7 also provided with an actuator for actuating the clutches, an inverter and an electric storage device for the motor generator 3, and an electronic control unit for controlling the power transmission unit.

Figure 9:
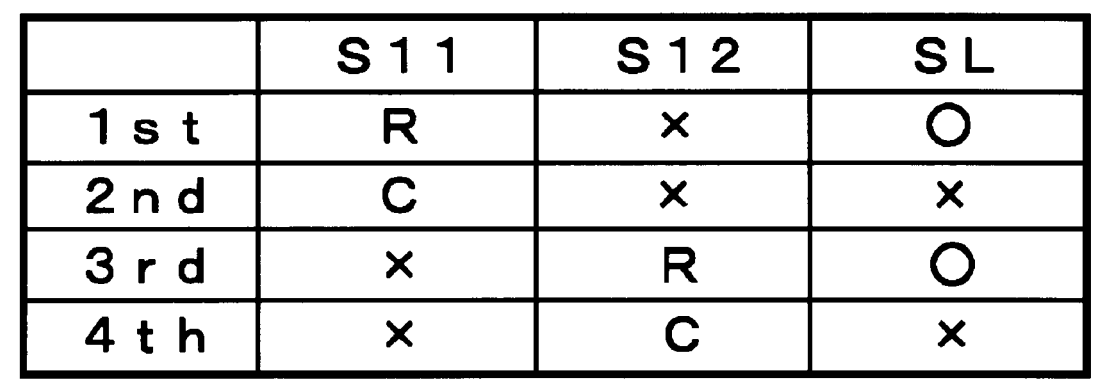

As described, the power transmission unit shown in FIG. 7 is capable of setting four forward gear stages by connecting the engine 2 mechanically and directly with the output shaft 36. FIG. 9 is a table showing relations between the gear stages set by the power transmission unit shown in FIG. 7, and engagement states of the clutches S11, S12 and SL under each gear stage. In FIG. 9, "R" represents a state in which the sleeve of the clutch is positioned at aforementioned R position, "C" represents a state in which the sleeve of the clutch is positioned at aforementioned C position, "○" represents a state in which the lock clutch SL is engaged, and "X" represents a state in which the clutch is disengaged.

Specifically, under the first stage, the lock clutch SL is engaged to lock (or halt) the motor generator 3, and the first drive gear 14a is connected with the ring gear Rg by moving the clutch S11 to the R position. When the motor generator 3 is locked by the lock clutch SL, the sun gear Sn of the planetary gear mechanism 1 is halted, and in this situation, the torque is inputted to the carrier Cr from the engine 2. Therefore, the planetary gear mechanism 1 functions as a speed reducing mechanism. Consequently, the torque inputted to the carrier Cr from the engine 2 through the starting clutch 34 is outputted from the ring gear Rg while being amplified by the planetary gear mechanism 1, and the torque of the ring gear Rg is transmitted to the output shaft 36 while being amplified by the first gear pair 14. Thus, the first stage is set by the planetary gear mechanism 1 and the first gear pair 14, therefore, the speed change ratio of the first stage can be calculated by multiplying the speed change ratio according to the planetary gear mechanism 1 by the gear ratio of the first gear pair 14.

Figure 10:
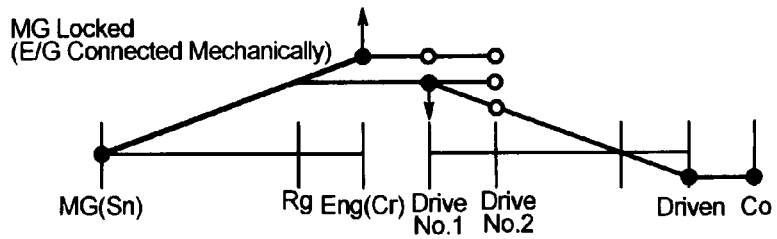
FIG. 10 is a nomographic diagram explaining changes in the behavior of the example shown in FIG. 7 in case of carrying out an upshifting sequentially from the first stage to the third stage.
Figure 10:
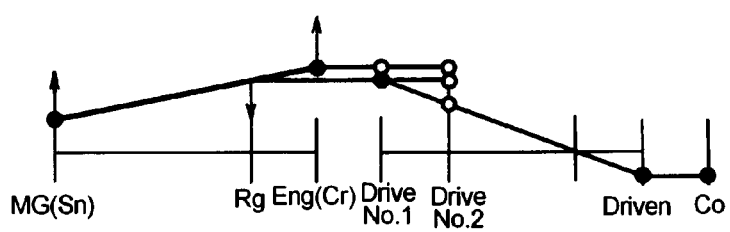
Figure 10:
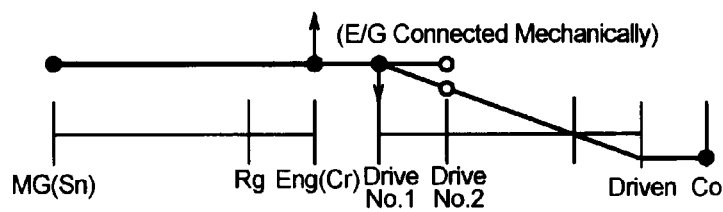
Figure 10:
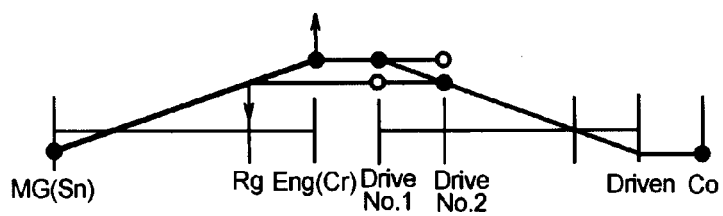
Figure 10:
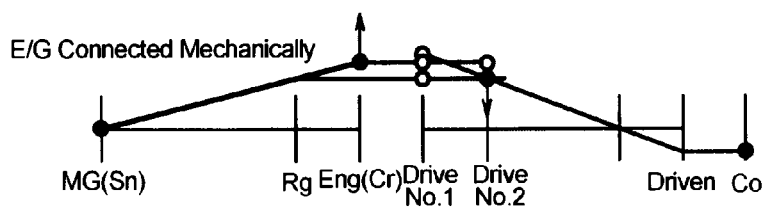

An operating state of the power transmission unit under the first stage is indicated by a nomographic diagram in FIG. 10 (a). As described, a double pinion type planetary gear mechanism is used as the planetary gear mechanism 1. Specifically, the rotary elements of the planetary gear mechanism 1 are arranged to be situated in a nomographic diagram in the order of the sun gear Sn, the ring gear Rg, and the carrier Cr. Under the first stage, the sun gear Sn is halted, the torque is inputted to the carrier Cr, and the torque is transmitted from the ring gear Rg to the first drive gear 14a. The first speed change gear pair 14 functions to reduce the speed and to reverse the direction of the torque, therefore, the first driven gear 14b is rotated backwardly and the torque is outputted therefrom to the differential 29 thorough the counter gear 37 (Co).

In this situation, the carrier Cr connected with the engine 2 and the input shaft 33 are rotated in the forward direction at the speed higher than the rotational speed of the first drive gear 14a. In case of starting the vehicle under the first stage, the torque to be transmitted to the carrier Cr is increased gradually by carrying out a so-called "frictional start", specifically, by engaging the disengaged starting clutch 34 gradually. As a result, the drive torque is increased gradually so that the vehicle can be started smoothly.

Under the second stage, the lock clutch SL is disengaged and the planetary gear mechanism 1 is integrated entirely by shifting the clutch S11 to the C position. Therefore, the planetary gear mechanism 1 does not carry out a speed change, and the engine 2 is connected directly with the first drive gear 14a. Accordingly, the speed change ratio of the second stage is governed by the gear ratio of the first speed change gear pair 14. In case of shifting to the second stage, a synchronization of the rotational speeds is carried out by operating the motor generator 3.

After disengaging the lock clutch SL, when the motor generator 3 is driven as a motor to output the torque in the forward direction, the rotational speeds of the engine 2 and the carrier Cr connected therewith are lowered as shown in FIG. 10 (b). In this case, the torques of the engine 2 and the motor generator 3 are controlled in order not to vary the output shaft torque. As described, the rotational speed of the sun gear Sn is increased and the rotational speed of the carrier Cr is lowered, and the rotational speeds of the sun gear Sn, the carrier Cr, and the ring gear Rg are thereby synchronized eventually. As a result, the planetary gear mechanism 1 is rotated entirely and integrally. In this situation, the rotational speeds of the hub 43 integrated with the ring gear Rg and the hub 44 integrated with the carrier Cr are synchronized with each other, as shown in FIG. 10 (c). Therefore, the rotational speed will not be varied even if the sleeve 46 of the clutch S11 is shifted from the R position to the C position. That is, in case of shifting the sleeve of the clutch, a synchronous control of the rotational speeds is to be carried out, therefore, an occurrence of a shift shock can be avoided or minimized.

The third stage is set by engaging the lock clutch SL to lock the motor generator 3, disengaging the clutch S11, and shifting the sleeve 46 of the clutch S12 to the R position. As explained, in case of halting the motor generator 3 by engaging the lock clutch SL, the sun gear Sn of the planetary gear mechanism 1 is halted so that the planetary gear mechanism 1 functions as a speed reducing mechanism. In this situation, the second drive gear 15a is connected with the ring gear Rg. Therefore, the power outputted from the engine 2 is reduced by the planetary gear mechanism 1 and transmitted to the second drive gear 15a, and further transmitted to the output shaft 36 through the second gear pair 15. Thus, the second stage is set by the planetary gear mechanism 1 and the second gear pair 15. Accordingly, the speed change ratio of the second stage can be calculated by multiplying the speed change ratio according to the planetary gear mechanism 1 by the gear ratio of the second gear pair 15.

Here will be explained a synchronous control to be carried out during a shifting operation from the second stage to the third stage. Under the second stage, the motor generator 3 is unlocked. Therefore, when the rotational speed of the motor generator 3 is lowered gradually to zero and then increased in the backward direction, the rotational speed of the ring gear Rg is lowered while keeping the rotational speed of the carrier Cr. Consequently, the rotational speed of the hub 48 integrated with the ring gear Rg is lowered. On the other hand, the second drive gear 15a is engaged with the second driven gear 15b, therefore, the second drive gear 15a is rotated at a speed lower than that of the engine 2 or the carrier Cr. Those processes are shown in FIG. 10 (d).

Thus, the rotational speed of the ring gear Rg is synchronized with the second drive gear 15a is by varying the rotational speed of the motor generator 3 as explained above. When such synchronization of those rotational speeds is completed, the sleeve 46 of the clutch S12 is shifted to the R position thereby connecting the ring gear Rg with the second drive gear 15a. Therefore, as the case of shifting operation from the first stage to the second stage, the rotational speed will not be fluctuated and a shift shock will not occur during the sifting operation from the second stage to the third stage. After thus shifting the sleeve 46 of the clutch S12, the rotation of the motor generator 3 is halted by controlling the rotational speeds of the engine 2 and the motor generator 3, and the motor generator 3 is locked by the lock clutch SL. The situation thereof is shown in FIG. 10 (e).

The fourth stage is set by disengaging the lock clutch SL, and shifting the sleeve 46 of the clutch S12 to the C position thereby connecting the second drive gear 15a with the carrier Cr. Thus, the shifting operation from the third stage to the fourth stage is carried out by shifting the sleeve 46 of the clutch S12 from the R position to the C position. That is, although a different clutch is shifted, the control contents to carry out the shifting operation from the third stage to the fourth stage are substantially identical to the control contents to carry out the shifting operation from the first stage to the second stage. Therefore, the synchronous control can be carried out by the same procedure as that carried out under the shifting operation from the first stage to the second stage.

Thus, although the power transmission unit shown in FIG. 7 is provided with two kinds of the speed change gear pairs, the power transmission unit shown in FIG. 7 is capable of setting the four forward stages. That is, the number of the speed change gear pairs is smaller than the number of settable gear stages. Therefore, the power transmission unit can be downsized entirely. Moreover, a synchronous control can be carried out in case of carrying out a shifting operation to the contiguous stage. Therefore, a shifting operation can be carried out without causing a shift shock even if the clutches SL, S11 and S12 are composed of dog clutches.

Further, according to the power transmission unit shown in FIG. 7, the clutch S12 for setting the even gear stages and the clutch S11 for setting the odd gear stages are arranged on both sides of the planetary gear mechanism 1. Therefore, the sleeves 42 and 46 can be exposed by removing covering members of those sleeves 42 and 46. For this reason, a dog clutch can be used as the clutches S11 and S12, and an arrangement and a configuration of the actuator for actuating the sleeves of those clutches can be simplified. In addition, since the sleeves 42 and 46 of the clutches S11 and S12 can be shifted among three positions, individual clutch can be used commonly to set plural gear stages. Therefore, the number of the elements can be reduced relatively so that the power transmission unit can be downsized entirely.

Furthermore, the power transmission unit shown in FIG. 7 is capable of setting the gear stages by multiplying the gear ratio of the speed change gear pair 14 or 15 by the speed change ratio of the planetary gear mechanism 1 functioning as a speed reducing mechanism or a speed change mechanism. Therefore, a total range of the speed change ratio (i.e., a gear range) of the power transmission unit can be widened but each range between the contiguous gear stages (i.e., a gear ratio) can be narrowed. For this reason, power characteristics and fuel economy of the power transmission unit can be improved.

Next, here will be explained another example of the present invention in which the power transmission unit shown in FIG. 1 is partially altered to set more gear stages. As shown in FIG.

11, the engine 2 as the first prime mover and the motor generator 3 as the second prime mover are connected with the planetary gear mechanism 1 as a differential mechanism. A double pinion type planetary gear mechanism is used as the planetary gear mechanism 1 also in this example, and the engine 2 is connected with the carrier Cr thereof through the input shaft 33. On the other hand, the motor generator 3 is connected with the sun gear Sn. The carrier Cr is also connected with a first drive shaft 49, and a hollow second drive shaft 50 is fitted onto the first drive shaft 49 in a rotatable manner is connected with the ring gear Rg. Here, those drive shafts 49 and 50 are arranged coaxially with the planetary gear mechanism 1 in the opposite side of the engine 2 across the planetary gear mechanism 1.

The first output shaft 11 and the second output shaft 12 are arranged in parallel with the drive shafts 49 and 50, the counter gear 27 and 28 are individually arranged on the output shafts 11 and 12 at the end portions of the engine 2 side, and the output shafts 11 and 12 are connected with the differential 29 through the counter gears 27 and 28 and the ring gear 30 meshing therewith.

The first drive shaft 49 protrudes from a leading end of the second drive shaft 50, and the second drive gear 15a and a sixth drive gear 51a are arranged on the protruding portion of the first drive shaft 49 in a manner to rotate integrally therewith. A sixth driven gear 51b meshing with the sixth drive gear 51a is fitted onto the first output shaft 11 and held in a rotatable manner, and the second driven gear 15b is fitted onto a boss portion of the sixth driven gear 51b and held in a rotatable manner to be engaged with second drive gear 15a.

The first drive gear 14a, and a fifth drive gear 52a are arranged integrally with the second drive shaft 50 in this order from the planetary gear mechanism 1 side, and the third drive 16a is arranged on a leading end side of the second drive shaft 50 and fitted onto the first drive shaft 49 in a rotatable manner. Meanwhile, the third driven gear 16b meshing with the third drive 16a, and the first driven gear 14b meshing with the first drive gear 14a are fitted onto the second output shaft 12 in a rotatable manner. A boss portion of the first driven gear 14b extends toward the third driven gear 16b side, and a fifth driven gear 52b meshing with the fifth drive gear 52a is fitted onto the boss portion in a rotatable manner.

A reverse driven gear 53b is fitted onto the first output shaft 11 in a rotatable manner, and an idle gear 54 is engaged with the reverse driven gear 53b and the first drive gear 14a. Therefore, the first drive gear 14a also serves as a reverse drive gear.

Figure 11:
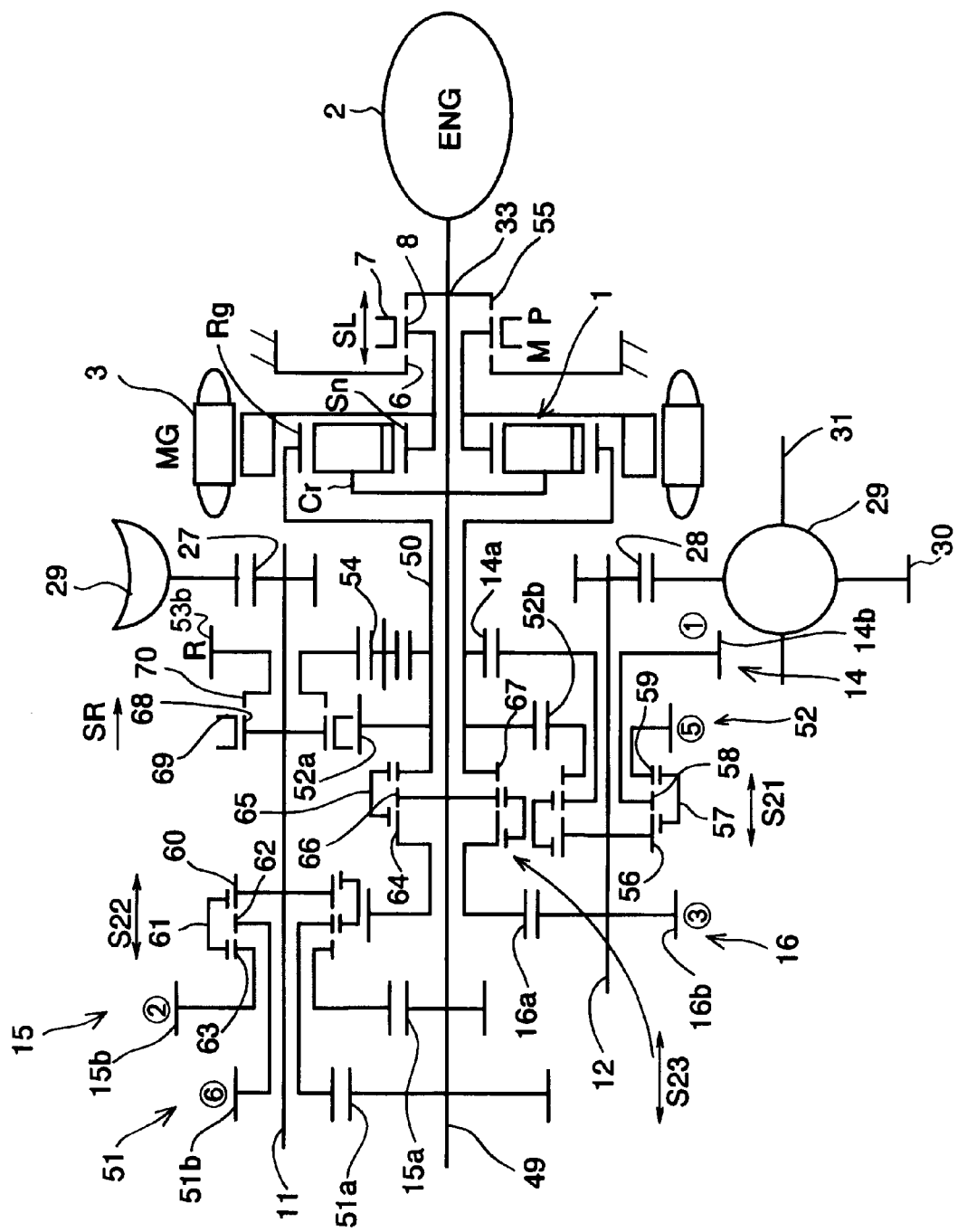
FIG. 11 is a skeleton diagram showing still another example of a power transmission unit according to the present invention.

The lock clutch SL shown in FIG. 11 is adapted to lock the motor generator 3 and to integrate the planetary gear mechanism 1 entirely. For this purpose, the hub 8 integrated with the rotor of the motor generator 3 is arranged coaxially with the input shaft 33. The sleeve 7 is splined to the hub 8 in a manner to move in the axial direction, and the fixed hub 6 is arranged adjacent to the hub 8. A hub 55 integrated with the input shaft 33 is arranged in the opposite side of the fixed hub 6 across the hub 8. That is, the sleeve 7 is adapted to be splined to both of those hubs 8 and 55.

In order to enable the speed change gear pairs 14, 15, 16, 51, 52 and 53 to transmit the torque selectively, the power transmission unit shown in FIG. 11 is provided with four clutches S21, S22, S23 and SR. Specifically, the first clutch S21 is a clutch mechanism, which is adapted to connect the first driven gear 14b and the fifth driven gear 52b selectively with the second output shaft 12, and which is arranged between the third driven gear 16b and the fifth driven gear 52b. The first clutch S21 comprises: a hub 56, which is integrated with the second output shaft 12; sleeve 57, which is splined to the hub 56 in a manner to move in the axial direction; a hub 58, which is integrated with the boss portion of the first driven gear 14b, and to which the sleeve 57 is splined selectively; and a hub 59, which is integrated with the boss portion of the fifth driven gear 52b, and to which the sleeve 57 is splined selectively.

Those hubs 56, 58 and 59 are aligned in the order as mentioned, and the sleeve 57 is adapted to be shifted among a first engagement position, a second engagement position and a disengagement position. In case the sleeve 57 is shifted to the first engagement position, the sleeve 57 is splined to the hub 56 of the second output shaft 12 and to the hub 58 of the first driven gear 14b. In case the sleeve 57 is shifted to the second engagement position, the sleeve 57 is splined to the hub 56 of the second output shaft 12 and to the hub 59 of the fifth driven gear 52b. In case the sleeve 57 is shifted to the disengagement position, the sleeve 57 is splined only to the hub 56 of the second output shaft 12. Those engagement positions are indicated by ① and ⑤ in FIG. 11. Additionally, an electric type or a hydraulic type actuator, or a linkage mechanism combined with the actuator can be used to actuate the sleeve 57.

A structure of the second clutch S22 is similar to that of the first clutch S21 in principle. That is, the second clutch S22 is a clutch mechanism, which is adapted to connect the second driven gear 15b and the sixth driven gear 51b selectively with the first output shaft 11, and which is arranged between the second driven gear 15b and the reverse driven gear 53b on the first output shaft 11. The second clutch S22 comprises: a hub 60, which is integrated with the first output shaft 11; a sleeve 60, which is splined to the hub 60 in a manner to move in the axial direction; a hub 62, which is integrated with the boss portion of the sixth driven gear 51b, and to which the sleeve 61 is splined selectively; and a hub 63, which is integrated with the boss portion of the second driven gear 15b, and to which the sleeve 61 is splined selectively.

Those hubs 60, 62 and 63 are aligned in the order as mentioned, and the sleeve 61 is adapted to be shifted among a first engagement position, a second engagement position and a disengagement position. In case the sleeve 61 is shifted to the first engagement position, the sleeve 61 is splined to the hub 60 of the first output shaft 11 and to the hub 62 of the sixth driven gear 51b. In case the sleeve 61 is shifted to the second engagement position, the sleeve 61 is splined to the hub 60 of the first output shaft 11 and to the hub 63 of the second driven gear 15b. In case the sleeve 61 is shifted to the disengagement position, the sleeve 61 is splined only to the hub 60 of the first output shaft 11. Those engagement positions are indicated by ② and ⑥ in FIG. 11. Additionally, an electric type or a hydraulic type actuator, or a linkage mechanism combined with the actuator can be used to actuate the sleeve 61.

A structure of the third clutch S23 is similar to those of the first clutch S21 and the second clutch S22 in principle. That is, the second clutch S23 is a clutch mechanism, which is adapted to connect the third drive gear 16a selectively with the first drive shaft 49 (or the carrier Cr) and with the second drive shaft 50 (or the ring gear Rg). The third clutch S23 comprises: a hub 64, which is integrated with the third drive gear 16a; a sleeve 65, which is splined to the hub 64 in a manner to move in the axial direction; a hub 66, which is integrated with the first drive shaft 49, and to which the sleeve 65 is splined selectively; and a hub 67, which is integrated with the second drive shaft 50, and to which the sleeve 65 is splined selectively.

Those hubs 64, 66 and 67 are aligned in the order as mentioned, and the sleeve 65 is adapted to be shifted among a first engagement position, a second engagement position and a disengagement position. In case the sleeve 65 is shifted to the first engagement position, the sleeve 65 is splined to the hub 64 of the third drive gear 16a and to the hub 66 of the first drive shaft 49. In case the sleeve 65 is shifted to the second engagement position, the sleeve 65 is splined to the hub 64 of the third drive gear 16a and to the hub 67 of the second drive shaft 50. In case the sleeve 65 is shifted to the disengagement position, the sleeve 65 is splined only to the hub 64 of the third drive gear 16a. Here, an electric type or a hydraulic type actuator, or a linkage mechanism combined with the actuator can be used to actuate the sleeve 65.

The power transmission unit shown in FIG. 11 is further provided with a reverse clutch SR, which is adapted to connect the reverse driven gear 53b selectively with the first output shaft 11. A structure of the reverse clutch SR is similar to those of the aforementioned clutches in principle. Specifically, the reverse clutch SR comprises: a sleeve 69, which is splined to the hub 68 integrated with the first output shaft 11 in a manner to move in the axial direction; and a hub 70, which is arranged adjacent to the hub 68, and which is integrated with the reverse driven gear 53b. Therefore, when the sleeve 69 is shifted toward the reverse driven gear 53b side to be splined to the hub 70, the reverse driven gear 53b is connected with the first output shaft 11 through the sleeve 69 and the hub 68. The remaining elements are identical to those of the example shown in FIG. 1, therefore, further explanation for the remaining elements will be omitted by allotting common reference numerals to FIG. 11. In addition, although not especially shown, the power transmission unit shown in FIG. 11 also comprises an actuator for actuating the clutches, an inverter and an electric storage device for the motor generator 3, and an electronic control unit for controlling the power transmission unit.

The power transmission unit shown in FIG. 11 is capable of setting six forward stages and a reverse stage for driving the vehicle by the power of the engine 2. FIG. 12 is a table showing a relation between the gear stages set by the power transmission unit shown in FIG. 11, and engagement states of the clutches S21, S22, S23, SR and SL under each gear stage. In FIG. 12, circled numbers in FIG. 12 correspond individually to the circled numbers in FIG. 11, that is, the engagement positions in FIG. 11, "R" in the column of the third clutch S23 represents a state in which the third driven gear 15a is connected with the ring gear Rg (or the second drive shaft 50), and "C" represents a state in which the third driven gear 15a is connected with the carrier Cr (or the first drive shaft 49). In addition, in the column of the lock clutch SL, "P" represents an engagement state in which the sleeve 7 is splined to the hub 55 integrated with the input shaft 33 so that the planetary gear mechanism 1 is integrated entirely, "M" represents an engagement state in which the sleeve 7 is splined to the fixed hub 6 thereby locking the motor generator 3. In FIG. 12, "X" represents a state in which the clutch is disengaged.

Specifically, under the first stage, the first driven gear 14b is connected with the second output shaft 12 by the first clutch 21. In this situation, the motor generator 3 is used as a generator to apply a resultant negative torque to the sun gear Sn thereby increasing the torque of the ring gear Rg gradually. Consequently, the torque transmitted to the second output shaft 12 through the first gear pair 14 is increased gradually. Therefore, the drive torque is increased gradually so that the vehicle is allowed to start smoothly. Then, the motor generator 3 is driven as a motor to output the torque in the forward direction, and when the rotational speed of the sun gear Sn is synchronized with the rotational speed of the carrier Cr, the sun gear Sn is connected with the carrier Cr by shifting the sleeve 7 of the lock clutch SL to the position indicated by "P" in FIG. 12. In other words, the planetary gear mechanism 1 is integrated entirely. Here, the speed change ratio at the first stage is governed by the gear ratio of the first gear pair 14.

The second stage is set by connecting the second driven gear 15b with the first output shaft 11 by the second clutch S22, while disengaging the remaining clutches. Under the second stage, the first drive shaft 49 connected with the engine 2 through the carrier Cr is connected with the first output shaft 11 by the second gear pair 15. That is, the second stage is a directly connected stage, and the speed change ratio thereof is governed by the gear ratio of the second gear pair 15.

The third gear stage is set by connecting the third drive gear 16a with the second drive shaft 50 (or the ring gear Rg) by shifting the sleeve 65 of the third clutch S23 to the "R" position, while locking the motor generator 3 and the sun gear Sn connected therewith by shifting the sleeve 7 of the lock clutch SL to the position indicated by "M" in FIG. 12. Consequently, the power of the engine 2 is inputted to the carrier Cr of the planetary gear mechanism 1 under the situation in which the sun gear Sn is being halted. Therefore, the planetary gear mechanism 1 functions as a speed reducing mechanism, and the torque inputted thereto is amplified according to the gear ratio and outputted from the ring gear Rg. The rotational speed of the torque outputted from the ring gear Rg is further changed by the third gear pair 16, and the torque is transmitted to the second output shaft 12. Then, the torque is outputted from the differential 29. Accordingly, the speed change ratio of the third stage is can be calculated by multiplying the speed reducing ratio of the planetary gear mechanism 1 by the speed change ratio of the third gear pair 16.

Meanwhile, the fourth stage is set by connecting the third drive gear 16a with the first drive shaft 49 (or the carrier Cr) by the third clutch S23. Since the first drive shaft 49 is thus connected with the engine 2 through the carrier Cr, the power outputted from the engine 2 is transmitted to the third drive gear 16a as it is. That is, contrary to the shifting operation of setting the third stage, the planetary gear mechanism 1 outputs the power inputted thereto without reducing the speed thereof. Accordingly, the speed change ratio of the fourth stage is governed by the gear ratio of the third gear pair 16, and the third gear pair 16 is used commonly to set the third stage and the fourth stage.

The fifth stage is set by connecting the fifth driven gear 52b with the second output shaft 12 by the first clutch S21, while integrating the planetary gear mechanism 1 entirely by shifting the sleeve 7 the lock clutch SL to the position indicated by "P" in FIG. 12. Therefore, the power outputted from the engine 2 is transmitted from the planetary gear mechanism 1 being rotated integrally to the second drive shaft 50. The power is further transmitted to the second output shaft 12 through the fifth drive gear 52a arranged on the second drive shaft 50 and the fifth driven gear 52b meshing therewith. Then, the power is outputted from the counter gear 28 to the differential 29. Accordingly, the speed change ratio of the fifth stage is governed by the gear ratio of the fifth gear pair 52.

The sixth stage is set by connecting the sixth driven gear 51b with the first output shaft 11 by the second clutch S22, while disengaging the remaining clutches. Under the sixth stage, the first drive shaft 49 connected with the engine 2 through the carrier Cr is connected with the first output shaft 11 by the sixth gear pair 51. That is, the sixth stage is a directly connected stage in which the power of the engine 2 is transmitted directly to the first output shaft 11, and the speed change ratio thereof is governed by the gear ratio of the sixth gear pair 51.

In case of setting the reverse stage (Rev), the reverse driven gear 53b is connected with the first output shaft 11 by the reverse clutch SR. In this situation, as in the case of starting the vehicle under the first stage, the vehicle is started while increasing the negative torque of the motor generator 3. Then, the sleeve 7 of the lock clutch SL is shifted to the position indicated by "P" in FIG. 12 under the situation where the planetary gear mechanism 1 is being rotated integrally. Therefore, the power outputted from the engine 2 is transmitted to the second drive shaft 50 as it is, and further transmitted from the first drive gear 14a attached thereto to the reverse driven gear 53b through the idle gear 54. Since the idle gear 54 thus intervenes in the power transmission route, the reverse driven gear 53b and the first output shaft 11 connected therewith are rotated in the direction opposite to the case of driving the vehicle in the forward direction. As a result, the reverse stage is set.

Thus, the power transmission unit shown in FIG. 11 is capable of setting the six forward stages using only five pairs of the speed change gear pairs. Therefore, the power transmission unit can be downsized by reducing the number of the speed change gear pairs with respect to the number of settable gear stages. Moreover, since large number of the gear stages can be set in the power transmission unit in spite of downsizing the unit itself, the total gear range (i.e., gear range) thereof can be widened but each range between the contiguous gear stages (i.e., gear ratio) can be narrowed. For this reason, both power characteristics and fuel economy of the power transmission unit can be improved.

Next, here will be explained an example in which the idler for setting the reverse stage is eliminated. Specifically, in FIG. 3, there is shown an example of the power transmission unit, in which the example shown in FIG. 1 is provided with the fifth gear pair 52, the sixth gear pair 51, the reverse driven gear 53b, and clutch mechanisms. Therefore, further explanation of the remaining elements identical to those of the example shown in FIG. 1 is omitted by allotting the common reference numerals to FIG. 13. In addition, although not especially shown, the power transmission unit shown in FIG. 13 also comprises an actuator for actuating the clutches, an inverter and an electric storage device for the motor generator 3, and an electronic control unit for controlling the power transmission unit.

Figure 13:
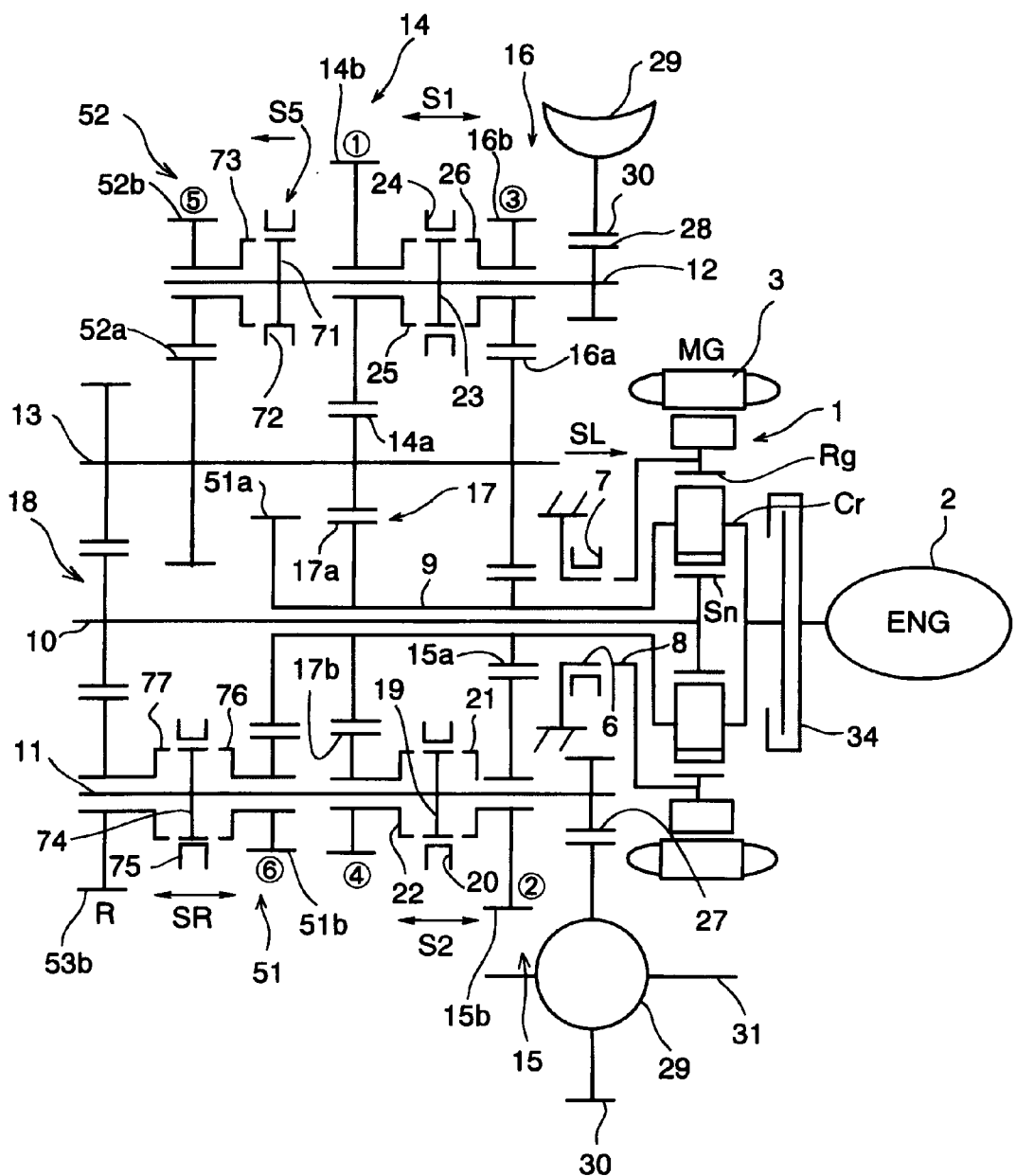
FIG. 13 is a skeleton diagram showing still another example of a power transmission unit according to the present invention.

As shown in FIG. 13, the fifth drive gear 52a is arranged on the idler shaft 13 at a position closer to the gear pair 18 than the first drive gear 14a, and the fifth driven gear 52b meshing therewith is fitted onto the second output shaft 12 in a rotatable manner. The sixth drive gear 51a is attached to an end portion of the first drive shaft 9, and the sixth driven gear 51b meshing therewith is fitted onto the first output shaft 11 in a rotatable manner. The gear pair 18 is arranged to connect the second drive shaft 10 and the idler shaft 13, and the reverse driven gear 53b is fitted onto the first output shaft 11 in a rotatable manner to be engaged with one of the gears of the gear pair 18 arranged on the second drive shaft 10.

A fifth clutch S5 is arranged adjacent to the fifth driven gear 52b. The fifth clutch S5 is adapted to connect the fifth driven gear 52b selectively with the second output shaft 12, and the clutch S5 comprises: a hub 71, which is integrated with the second output shaft 12; a sleeve 72, which is splined to the hub 71 in a manner to move in the axial direction; and a hub 73, which is integrated with the fifth driven gear 52b, and to which the sleeve 72 is splined selectively. Therefore, the fifth driven gear 52b is connected with the second output shaft 12 by moving the sleeve 72 toward the left side in FIG. 13 to spline the sleeve 72 to the hub 73. Additionally, an electric type or a hydraulic type actuator, or a linkage mechanism combined with the actuator can be used to actuate the sleeve 72.

The reverse clutch SR is arranged on the first output shaft 11 between the sixth driven gear 51b and the reverse driven gear 53b. The reverse clutch SR is a clutch mechanism similar to the clutch S2 for setting the odd gear stages, which is adapted to connect the sixth driven gear 51b and the reverse driven gear 53b selectively with the first output shaft 11. Specifically, the reverse clutch SR comprise a sleeve 75, which is splined to the hub 74, which is integrated with the first output shaft 11 in a manner to move in the axial direction; a hub 76, which is integrated with the sixth driven gear 51b; and a hub 77, which is integrated with the reverse driven gear 53b, and which is situated on the opposite side of the hub 76 across the hub 74.

Accordingly, the sixth driven gear 51b is connected with the first output shaft 11 through the sleeve 75 and the hub 74, by moving the sleeve 75 toward the sixth driven gear 51b side to spline the sleeve 75 to the hub 76. To the contrary, the reverse driven gear 53b is connected with the first output shaft 11 through the sleeve 75 and the hub 74 by moving the sleeve 75 toward the reverse driven gear 53b to spline the sleeve 75 to the hub 77. An electric type or a hydraulic type actuator, or a linkage mechanism combined with the actuator can also be used to actuate the sleeve 75.

As the aforementioned example shown in FIG. 7, the example shown in FIG. 13 is also provided with the starting clutch 34 adapted to connect the engine 2 selectively with the carrier Cr. Here, as will be explained below, the example shown in FIG. 13 is capable of using the planetary gear mechanism 1 as a torque converter. Therefore, it is also possible to connect the engine 2 mechanically with the carrier Cr without arranging the starting clutch 34. In addition, an arrangement of those shafts is identical to that of the example of FIG. 1, as shown in FIG. 2. Therefore, an interference of the lowest position of the vehicle with the road surface can be prevented.

The power transmission unit shown in FIG. 13 is capable of setting six forward stages and a reverse stage for driving the vehicle by the power of the engine 2. FIG. 14 is a table showing relations between the gear stages set by the power transmission unit shown in FIG. 13, and engagement states of the clutches S1, S2, S5, SR and SL under each gear stage. However, the procedures for setting the first stage to the fourth stage are identical to those in the example shown in FIG. 1. That is, the engagement states of the clutch S1 for setting the odd gear stages, the clutch S2 for setting the even gear stages, and the lock clutch SL under the gear stage from the first to the fourth stages are identical to those shown in FIG. 3. Therefore, further explanation of the procedures for setting the first to fourth stages will be omitted. Here, the fifth clutch S5 and the reverse clutch SR are disengaged under the first to fourth stages.

According to the power transmission unit shown in FIG. 13, the fifth stage is set by connecting the fifth driven gear 52b with the second output shaft 12 by engaging the fifth clutch S5, while halting the motor generator 3 and the ring gear Rg connected therewith by engaging the lock clutch SL. In this case, the power of the engine 2 is inputted to the carrier Cr of the planetary gear mechanism 1 in which the ring gear Rg is halted, and the power is outputted from the sun gear Sn to the second drive shaft 10. That is, the planetary mechanism 1 functions as a speed reducing mechanism. In this situation, the sun gear Sn functioning as an output element is rotated in a direction opposite to the rotational direction of the engine 2, and the torque of the sun gear Sn is transmitted to the idler shaft 13 and the fifth drive gear 52a attached thereto through the gear pair 18. Consequently, the fifth drive gear 52a is rotated in the same direction as the engine 2, and the torque of the fifth drive gear 52a is outputted to the second output shaft 12 through the fifth driven gear 52b. Accordingly, the speed change ratio of the fifth stage can be calculated by multiplying the speed change ratio of the planetary gear mechanism 1 functioning as a speed reducing mechanism by the gear ratio of the fifth gear pair 52. In this case, the rotational direction of the second output shaft 12 or the direction of the torque is opposite to the rotational direction of the engine 2.

The sixth stage is set by moving the sleeve 75 of the reverse clutch SR toward the sixth gear pair 51 side to spline the sleeve 75 to the hub 76 of the sixth driven gear 51b, that is, by allowing the sixth gear pair 51 to transmit the torque between the first drive shaft 9 and the first output shaft 11. In this case, the first drive shaft 9 is connected directly with the engine 2 through the carrier Cr. Therefore, only the sixth gear pair 51 is involved in the speed change between the engine 2 and the first output shaft 11. Accordingly, the speed change ratio of the sixth stage is governed by the gear ratio of the sixth gear pair 51. In this case, the rotational direction of the first output shaft 11 or the direction of the torque is opposite to the rotational direction of the engine 2.

The reverse stage (Rev) is set by moving the sleeve 75 of the reverse clutch SR toward the reverse driven gear 53b side to spline the sleeve 75 to the hub 77 of the reverse driven gear 53b while engaging the lock clutch SL. In this case, the planetary gear mechanism 1 functions as a speed reducing mechanism as a result of engaging the lock clutch SL. Therefore, the sun gear Sn of the planetary gear mechanism 1 is rotated in the backward direction, and the torque is transmitted therefrom to the second drive shaft 10, as in the case of the fifth stage. Since the reverse driven gear 53b is engaged with one of the gears of the gear pair 18 arranged on the second drive shaft 10, the power is transmitted to the first output shaft 11 from the second output shaft 12 through those gears. Therefore, the first output shaft 11 is rotated in the same direction as the rotational direction of the engine 2, or the torque acts in the same direction as the rotational direction of the engine 2. That is, the first output shaft 11 is rotated in the direction opposite to the rotational direction thereof under the forward stages. As a result, the reverse stage is set. Here, the speed change ratio of the reverse stage can be calculated by multiplying the speed change ratio of the planetary gear mechanism 1 functioning as a speed reducing mechanism by the gear ratio of the sixth gear pair 53.

As in the case of starting the vehicle under the first stage, in case of starting the vehicle under the reverse stage, the torque of the motor generator 3 is increased gradually in the backward direction thereby increasing the drive torque gradually. For this purpose, under the reverse stage, the lock clutch SL is disengaged in the beginning, and then engaged when the planetary gear mechanism 1 starts rotating integrally.

Thus, according to the example shown in FIG. 13, the reverse stage is set by utilizing the fact that the output element of the planetary gear mechanism 1 is rotated in the direction opposite to the rotational direction of the engine 2 in case of using the planetary gear mechanism 1 as a speed change mechanism. Therefore, it is unnecessary to arrange an idler for reversing the rotational direction or the direction of the torque. For this reason, the power transmission unit can be downsized entirely so that the power transmission unit is easily mounted on a vehicle. In addition, a cost of the power transmission unit can be suppressed. Moreover, according to the example shown in FIG. 13, the reverse clutch SR can be used not only for setting the sixth stage but also for setting the reverse stage. Therefore, the power transmission unit can be further downsized. Furthermore, the advantages of the power transmission unit shown in FIG. 1 can also be achieved by the power transmission unit shown in FIG. 13.

Next, here will be explained an example of the power transmission unit in which the idler shaft shown in FIGS. 1 and 13 is omitted. Specifically, unlike the example shown in FIG. 13, the idler shaft 13 is removed from the example shown in FIG. 15. Therefore, the first drive gear 14a and the third drive gear 16a are arranged directly on the second drive shaft 10. Consequently, the second output shaft 12 is arranged close to the second drive shaft 10 in the radial direction, and the first driven gear 14b and the third driven gear 16b held by the second output shaft 12 are individually engaged with the drive gears 14a and 16a.

Figure 15:
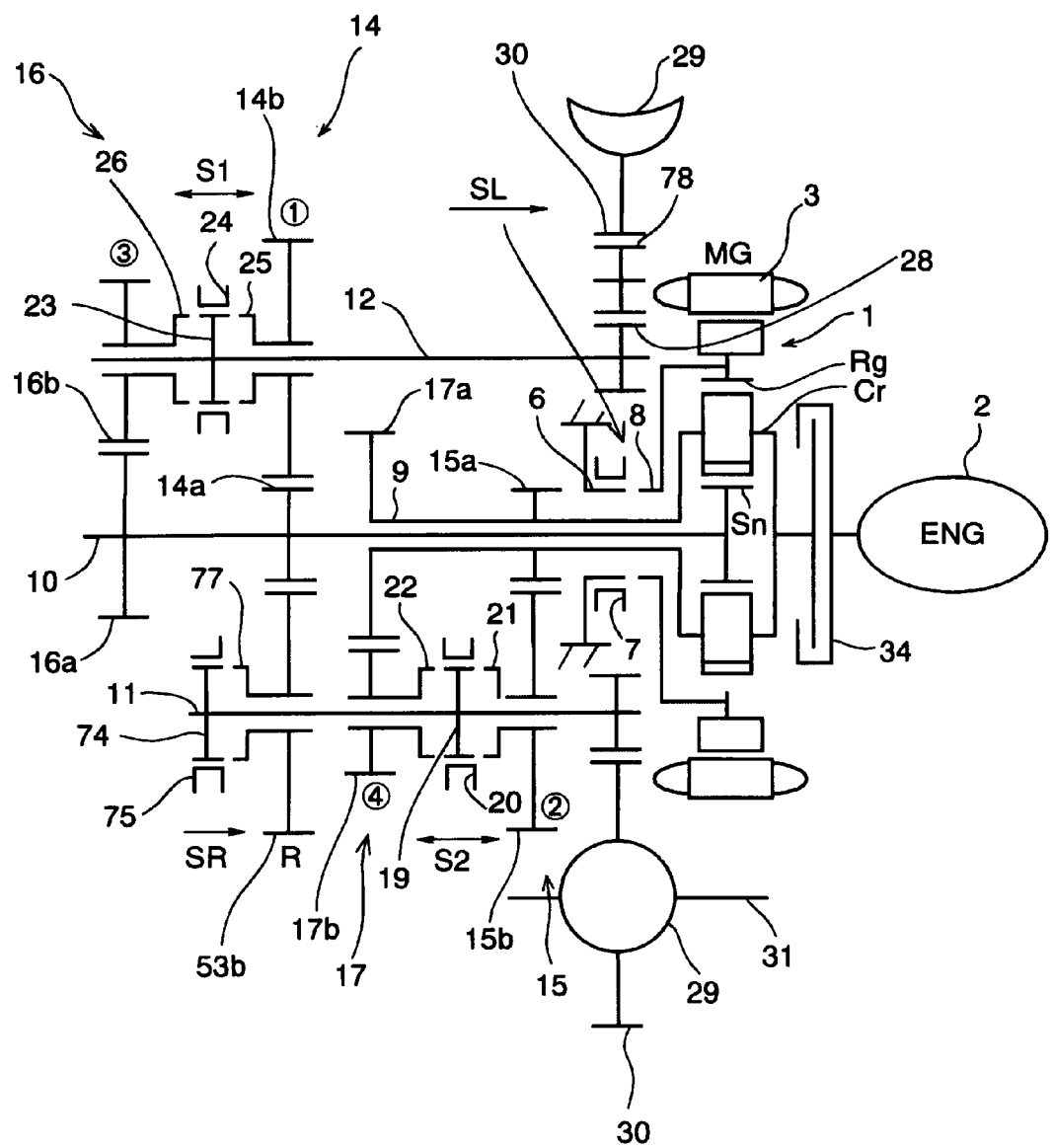
FIG. 15 is a skeleton diagram showing an example of a power transmission unit in which an idle gear is arranged on the side of the second output shaft instead of an idler shaft.

According to the example shown in FIG. 15, an idle gear 78 is interposed between the second output shaft 12 and the ring gear 30 of the differential 29, instead of the idler shaft 13. In addition, as a result of such removal of the idler shaft 13, the gear pair 18 is also removed from between the second drive shaft 10 and the idler shaft 13. Therefore, the reverse driven gear 53b is engaged with the first drive gear 14a. This structure corresponds to the inverting mechanism of the present invention. Here, the fifth gear pair 53 and the sixth gear pair 51 are not arranged in the power transmission unit shown in FIG. 15. The remaining elements are identical to those of the example shown in FIG. 1 or 13, therefore, further explanation of those elements will be omitted by allotting common reference numerals to FIG. 15.

Figure 16:
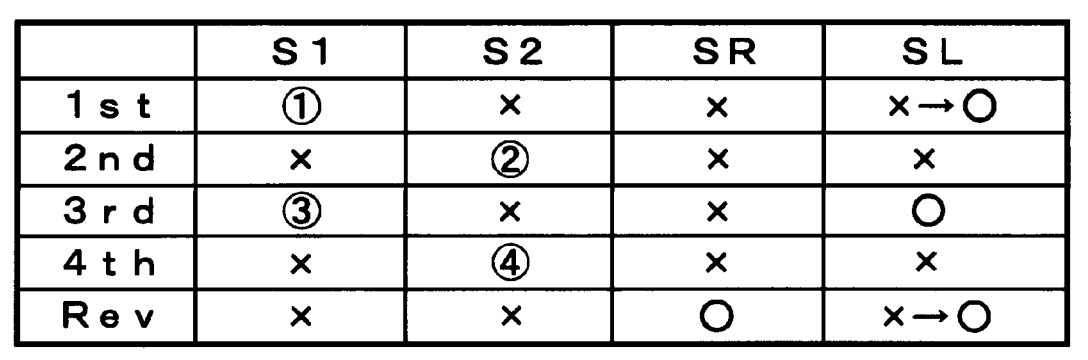

The power transmission unit shown in FIG. 15 is capable of setting four forward stages and a reverse stage by connecting the engine 2 directly and mechanically with the planetary gear mechanism 1. FIG. 16 is a table showing relations between the gear stages set by the power transmission unit shown in FIG. 15, and engagement states of the clutches S1, S2, SR and SL under each gear stage. In this example, the engagement states of the above-mentioned clutches under each gear stage are identical to the engagement states of those clutches under the first to fourth gear stages shown in FIG. 14, except for the fifth clutch S5. That is, the according to the example shown in FIG. 15, the first to fourth stages and the reverse stage can be set by the procedures explained above with reference to FIGS. 13 and 14.

According to the power transmission unit shown in FIG. 15, an arrangement of the shafts is substantially identical to that shown in FIG. 2 but positions of the second output shaft 12 and the idler shaft 13 are switched to each other. Therefore, an interference of the lowest position of the vehicle with the road surface can be prevented. For this reason, the power transmission unit shown in FIG. 15 can be mounted easily on a vehicle even if the height of the vehicle is low. Moreover, since the second output shaft 12 can be arranged close to the second drive shaft 10 in the radial direction, an outer diameter of the power transmission unit can be reduced to be downsized so that the power transmission unit can be mounted on the vehicle easily.

Figure 17:
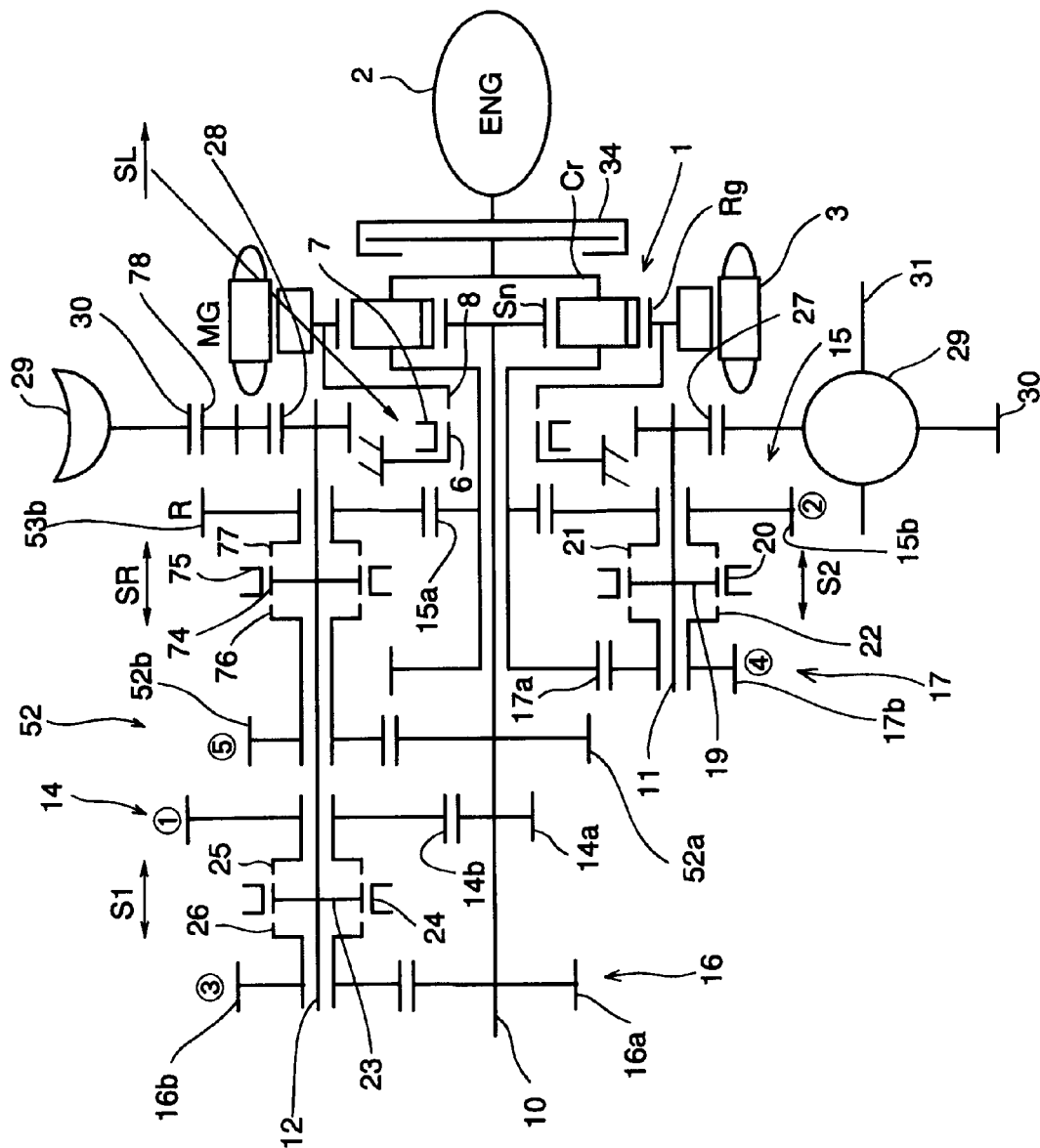
FIG. 17 is a skeleton diagram showing another example of a power transmission unit in which the clutches are further commoditized.

Another example of the present invention, in which the power transmission shown in FIG. 15 is altered partially to set five forward stages and a reverse stage is shown in FIG. 17. Specifically, the example shown in FIG. 17 is adapted to use the reverse clutch SR commonly for setting the fifth stage and the reverse stage. As shown in FIG. 17, the reverse driven gear 53b and the fifth driven gear 52b are arranged rotatably on the second output shaft 12 in the vicinity of the counter gear 28, and the reverse driven gear 53b is engaged with the second drive gear 15a arranged on the first drive shaft 9. This structure corresponds to the inverting mechanism of the present invention. On the other hand, the fifth drive gear 52a meshing with the fifth driven gear 52b is arranged on the second drive shaft 10.

The reverse clutch SR is situated between the reverse driven gear 53b and the fifth driven gear 52b on the second output shaft 12. The reverse clutch SR comprises: a sleeve 75, which is splined to the hub 74 integrated with the second output shaft 12 in a manner to move in the axial direction; a hub 76, which is integrated with the fifth driven gear 52b; and a hub 77, which is integrated with the reverse driven gear 53b, and which is situated on the opposite side of the hub 76 across the hub 74. Accordingly, the fifth driven gear 52b is connected with the second output shaft 12 through the sleeve 75 and the hub 74, by moving the sleeve 75 toward the fifth driven gear 52b to spline the sleeve 75 to the hub 76.

To the contrary, the reverse driven gear 53b is connected with the second output shaft 12 through the sleeve 75 and the hub 74 by moving the sleeve 75 toward the reverse driven gear 53b to spline the sleeve 75 to the hub 77. In addition, an electric type or a hydraulic type actuator, or a linkage mechanism combined with the actuator can be used to actuate the sleeve 75. The remaining elements are identical to those of the example shown in FIG. 15, therefore, further explanation of those elements will be omitted by allotting common reference numerals to FIG. 17.

Figure 18:
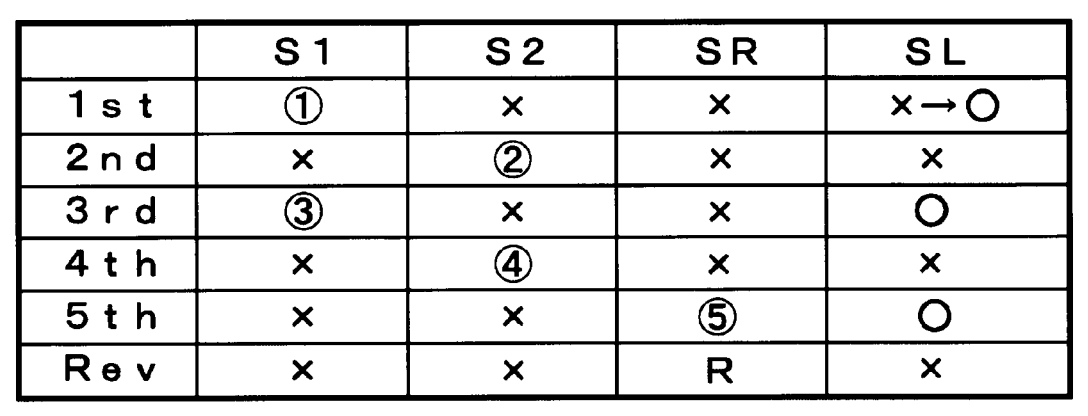

The power transmission unit shown in FIG. 17 is capable of setting five forward stages and a reverse stage by connecting the engine directly and mechanically with the planetary gear mechanism 1. FIG. 18 is a table showing relations between the gear stages set by the power transmission unit shown in FIG. 17, and engagement states of the clutches 51, S2, SR and SL under each gear stage. According to the example shown in FIG. 17, the engagement states of the above-mentioned clutches under each gear stage are identical to the engagement states of those clutches under the first to fifth gear stages shown in FIG. 14, except for the fifth clutch S5. That is, the according to the example shown in FIG. 17, the first to fifth stages and the reverse stage can be set by the procedures explained above with reference to FIGS. 13 and 14.

According to the example shown in FIG. 17, the reverse stage is set by connecting the reverse driven gear 53b with the second output shaft 12. However, in this case, the lock clutch SL is disengaged to unlock the motor generator 3. Therefore, in case of starting the vehicle under the reverse stage, the drive torque is increased gradually by engaging the starting clutch 34 gradually thereby increasing the torque transmitted from the engine 2 gradually. Such control of the starting clutch 34 can be carried out by sending the command signal from the electronic control unit, and the mechanism for carrying out this control corresponds to the friction start mechanism of the present invention.

Accordingly, the example shown in FIG. 17 is also capable of achieving the advantages of the example shown in FIG. 15. In addition, according to the example shown in FIG. 17, the reverse clutch SR is used commonly for setting the fifth stage and the reverse stage. Therefore, the power transmission unit can be downsized by reducing the number of the clutch mechanisms. In other words, the power transmission unit can be prevented from being enlarged even if the number of settable gear stage is increased.

According to the present invention, the power transmission unit can be adapted to rotate the output element of the differential mechanism in the direction opposite to the rotational direction of the input element to which the power is inputted from the engine 2. In this case, the idler shaft 13 and the idle gear 54 may be required to intervene in the power route under the gear stage set by the differential action of the differential mechanism. Instead of such configuration, it is also possible to arrange a reverse mechanism on an upstream side of the gear pair for setting the gear stage in the torque transmitting direction. For this purpose, a transmission mechanism such as a gear, a chain, a belt or the like can be used as the reverse mechanism, and the power transmission unit can be downsized significantly by using a planetary gear mechanism as the reverse mechanism.

Figure 19:
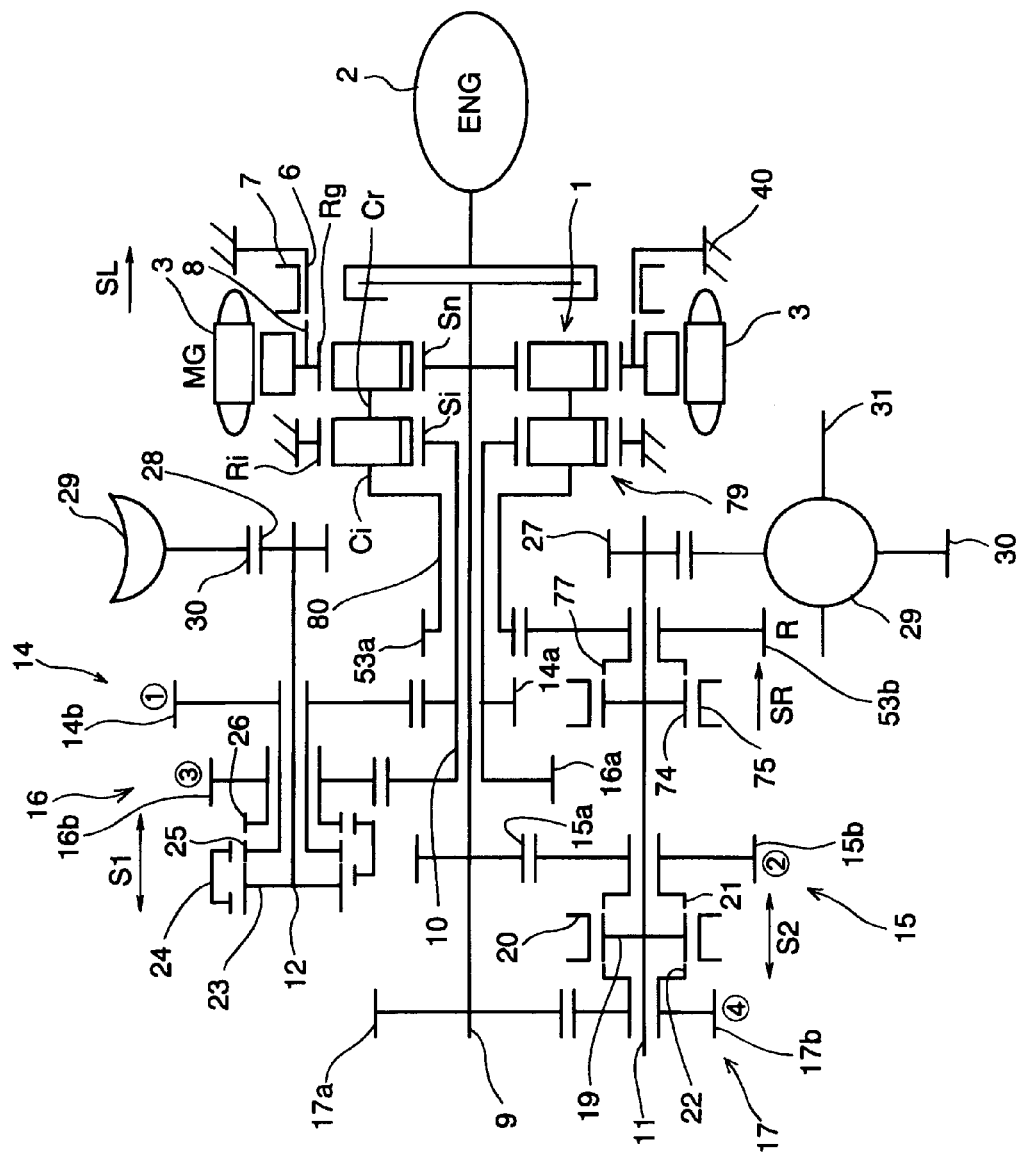
FIG. 19 is a skeleton diagram showing an example of a power transmission unit provided with a reverse mechanism.

An example of the above explained configuration is shown in FIG. 19. As shown in FIG. 19, a reverse mechanism 79 is arranged on an output side of the planetary gear mechanism 1 corresponding to the differential mechanism of the present invention. In this example, the planetary gear mechanism 1 is also a double pinion type planetary gear mechanism, in which the engine 2 is connected with the sun gear Sn through the starting clutch 34, and the rotor of the motor generator 3 is connected with the ring gear Rg. The motor generator 3 is situated on an outer circumferential side of the planetary gear mechanism 1. In order to halt (or to lock) the motor generator 3 and the ring gear Rg connected therewith selectively, the power transmission unit is provided with the lock clutch SL. The structure of the lock clutch SL is identical to that shown in FIG. 1, so further explanation will be omitted by allotting the common reference numerals to FIG. 19.

According to the example shown in FIG. 19, the reverse mechanism 79 is also a double pinion type planetary gear mechanism, which is arranged coaxially with the engine 2 and the planetary gear mechanism 1 on the opposite side of the engine 2 across the planetary gear mechanism 1. A ring gear Ri of the reverse mechanism 79 is fixed with a predetermined fixing member 40, and a carrier C1 is connected with the carrier Cr of the planetary gear mechanism 1.

The first drive shaft 9 is connected directly with the engine 2, and the sun gear Sn of the planetary gear mechanism 1 is arranged on the first drive shaft 9. The sun gear S1 of the reverse mechanism 79 is connected with the second drive shaft 10 for transmitting the torque to the speed change gear pairs in case of setting an odd gear stage. The second drive shaft 10 is a hollow shaft arranged around the first drive shaft 9 coaxially therewith. Additionally, a hollow reverse shaft 80 is arranged around the second drive shaft 10 coaxially therewith in a manner to rotate relatively therewith. One of the end portions of the reverse shaft 80 is connected with the carrier C1 of the reverse mechanism 79, and the reverse drive gear 53a is arranged on the other end portion thereof.

The aforementioned engine 2, planetary gear mechanism 1, reverse mechanism 79, drive shafts 9 and 10, and reverse shaft 79 are arranged coaxially, and the first output shaft t11 and the second output shaft 12 are arranged in parallel with the rotational axis of those elements. The second gear pair 15 and the fourth gear pair 17 for setting the even gear stages are arranged between the first drive shaft 9 and the first output shaft 11. Specifically, the first drive shaft 9 protrudes from the leading end of the second drive shaft 10, and the second drive gear 15a and the fourth drive gear 17a are arranged on the protruding portion. Meanwhile, the second driven gear 15b meshing with the second drive gear 15a and the fourth driven gear 17b meshing with the fourth drive gear 17a are arranged on the first output shaft 11 in a rotatable manner.

On the other hand, the first gear pair 14 and the third gear pair 16 for setting the odd gear stages are arranged between the second drive shaft 10 and the second output shaft 12. Specifically, the first drive gear 14a and the third drive gear 16a are arranged on the second drive shaft 10, and the first driven gear 14b meshing with the first drive gear 14a is held on the second output shaft 12 in a rotatable manner. The boss portion of the first driven gear 14b extends in the direction away from the counter gear 28 arranged on the second drive shaft 12, and the third driven gear 16b meshing with the third drive gear 16a is held on the boss portion of the first driven gear 14b in a rotatable manner.

In order to connect the first driven gear 14b and the third driven gear 16b selectively with the second output shaft 12, the clutch S1 for setting the odd gear stages is arranged on the second output shaft 12, on the opposite side of the first driven gear 14b across the third driven gear 16b. The clutch S1 comprises: a hub 23, which is integrated with the second output shaft 12; and a sleeve 24, which is splined to the hub 23 in a manner to move in the axial direction. The hub 23, the hub 25 integrated with the first driven gear 14b, and the hub 26 integrated with the third driven gear 16b are aligned in order. The sleeve 24 is shifted among a position to be splined to the hub 23 and the hub 25, a position to be splined to the hub 23 and the hub 26, and a position to be splined only to the hub 23. Additionally, an electric type or a hydraulic type actuator, or a linkage mechanism combined with the actuator can be used to actuate the sleeve 24.

On the other hand, the clutch S2 for setting the even gear stages is arranged on the first output shaft 11 between the second driven gear 15b and the fourth driven gear 17b. The structure of the clutch S2 is identical to that of the clutch S2 shown in FIG. 1. In addition, the reverse clutch SR is arranged adjacent to the reverse driven gear 53b on the first output shaft 11. The reverse clutch SR is adapted to connect the reverse driven gear 53b selectively with the first output shaft 11, and for example, the reverse clutch SR is structured as the reverse clutch SR shown in FIG. 11. The remaining elements are identical to those shown in FIG. 1, therefore, further explanation for the remaining elements will be omitted by allotting common reference numerals to FIG. 19. Here, although not especially shown in FIG. 19, the power transmission unit shown in FIG. 19 is also provided with an actuator for actuating the clutches, an inverter and an electric storage device for the motor generator 3, and an electronic control unit for controlling the power transmission unit.

Here will be explained an arrangement of the shafts in the power transmission unit shown in FIG. 19. As described, the engine 2, the planetary gear mechanism 1, the drive shafts 9 and 10 are arranged coaxially. The output shafts 11 and 12 for transmitting the power to the differential 29 are individually arranged in parallel with the drive shafts 9 and 10. Thus, a total of four shafts are used in the example shown in FIG. 19. A cross section of the shafts thus arranged in the vehicle is shown in FIG. 20.

Figure 20:
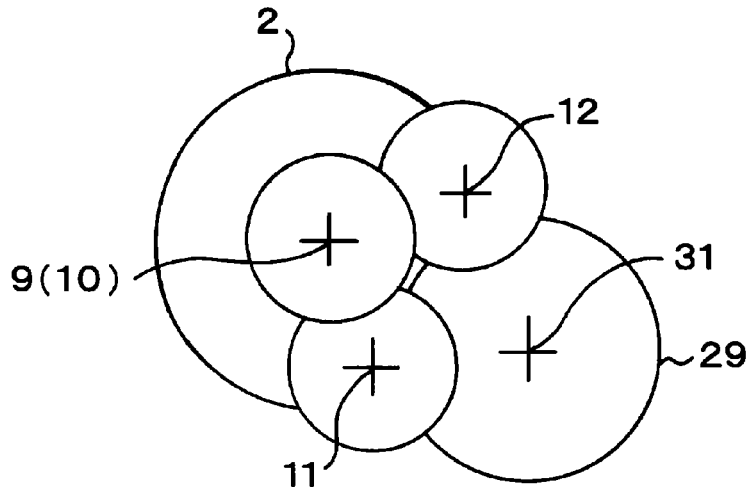
FIG. 20 is a view showing an arrangement of the axes in the example shown in FIG. 19.

As shown in FIG. 20, a rotation center of the differential 29 (i.e., the axle 31) is situated obliquely below a rotational center of the engine 2. The second output shaft 12 is situated above a plane including the rotation center of the engine 2 and the rotation center of the differential 29, and the first output shaft 11 is situated below such plane. Thus, a number of the shafts situated below the rotational centers of the large members having a large external diameter such as the engine 2 and the differential 29 can be reduced. Therefore, a friction between the shaft and a road surface can be prevented or avoided. In other words, a lowest portion of the vehicle can be elevated relatively even if the height of the vehicle is low.

Figure 21:
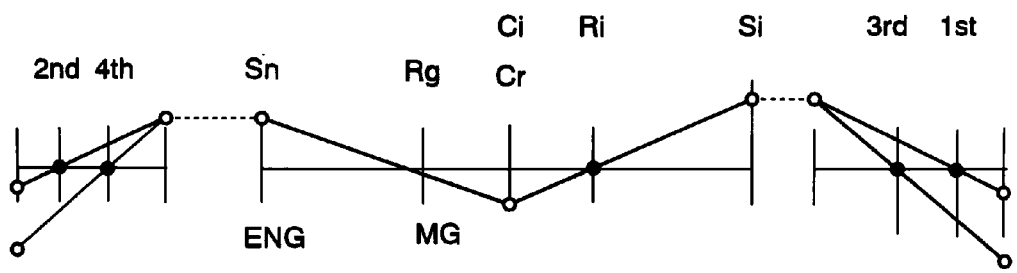
FIG. 21 is a nomographic diagram explaining actions of the reverse mechanism and the differential mechanism under the forward stage.

As described, the speed change gear pairs 14 and 16 for setting the odd gear stages are connected with the sun gear S1 of the reverse mechanism 79, therefore, the odd gear stages are set by locking the motor generator 3 by the lock clutch SL. On the other hand, the speed change gear pairs 15 and 17 for setting the even gear stage are adapted to be connected directly with the engine 2, therefore, the even gear stages are set by unlocking the motor generator 3. A nomographic diagram of the planetary gear mechanism 1 and the reverse mechanism 79 is shown in FIG. 21.

As described, the engine 2 is connected with the sun gear Sn of the planetary gear mechanism 1. Therefore, in case of locking the motor generator 3 and the ring gear Rg connected therewith by the lock clutch SL, the carrier Cr of the planetary gear mechanism 1 is rotated in the direction opposite to the rotational direction of the engine 2 (i.e., in the backward direction). The carrier C1 of the reverse mechanism 79 is connected with the carrier Cr, and the ring gear Ri is halted, therefore, the sun gear S1 connected with the second drive shaft 10 is ratated in the same direction as the rotational direction of the engine 2 (i.e., in the forward direction). The torque is outputted from the second drive shaft 10 to the second output shaft 12 through the first gear pair 14 or the third gear pair 16, therefore, the second output shaft 12 rotated in the direction opposite to the rotational direction of the engine 2 (i.e., in the backward direction).

On the other hand, under the even gear stages, the motor generator 3 is unlocked and the power is transmitted from the engine 2 to the first drive shaft 9. That is, the first drive shaft 9 is connected directly with the engine 2, and the power is transmitted to the first output shaft 11 through the second gear pair 15 or the fourth gear pair 17 arranged on the first drive shaft 9. Therefore, the first output shaft 11 is rotated in the direction opposite to the rotational direction of the engine 2 (i.e., in the backward direction).

Figure 22:
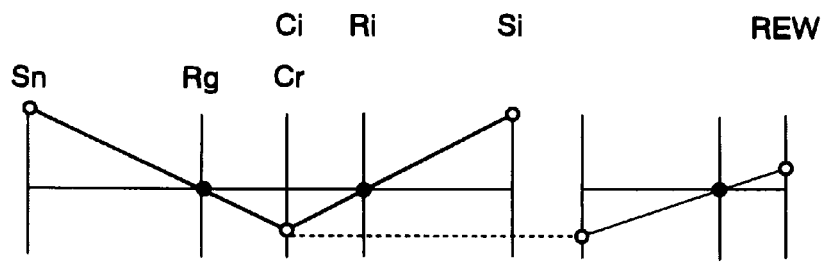
FIG. 22 is a nomographic diagram explaining actions of the reverse mechanism and the differential mechanism under the reverse stage.

FIG. 22 is a nomographic diagram of the case in which the reverse stage is set in the example shown in FIG. 19. Since the reverse drive gear 53a is connected with the carrier Cr of the planetary gear mechanism 1 through the carrier C1 of the reverse mechanism 79, the carrier Cr functions as an output element under the reverse stage. Therefore, the motor generator 3 and the ring gear Rg connected therewith are locked by the lock clutch SL. Consequently, in the planetary gear mechanism 1, the sun gear Sn to which the engine 2 is connected is rotated in the forward direction, and to the contrary, the carrier Cr functioning as an output element is rotated in the backward direction. In this situation, a reverse shaft 80 and the reverse drive gear 53a are rotated in the backward direction together with the carrier Cr, and the reverse driven gear 53b meshing with the reverse driven gear 53a and the first output shaft 11 integrated therewith are rotated in the same direction as the rotational direction of the engine 2. Thus, the first output shaft 11 is rotated in the direction opposite to the rotational direction thereof under the forward stage thereby setting the reverse stage.

Here, engagement states of the clutch S1, the clutch S2, the lock clutch SL, and the reverse clutch SR under the first to fourth stages and the reverse stage are identical to those indicated in FIG. 14. Therefore, further explanation for the engagement states of the clutches will be omitted.

Thus, according to the example shown in FIG. 19, it is unnecessary to interpose the idler shaft and the idle gear between the speed change gear pairs. Therefore, the power transmission unit can be downsized and lightened entirely by reducing an outer diameter thereof, so that the power transmission unit can be mounted on a vehicle easily.

Figure 23:
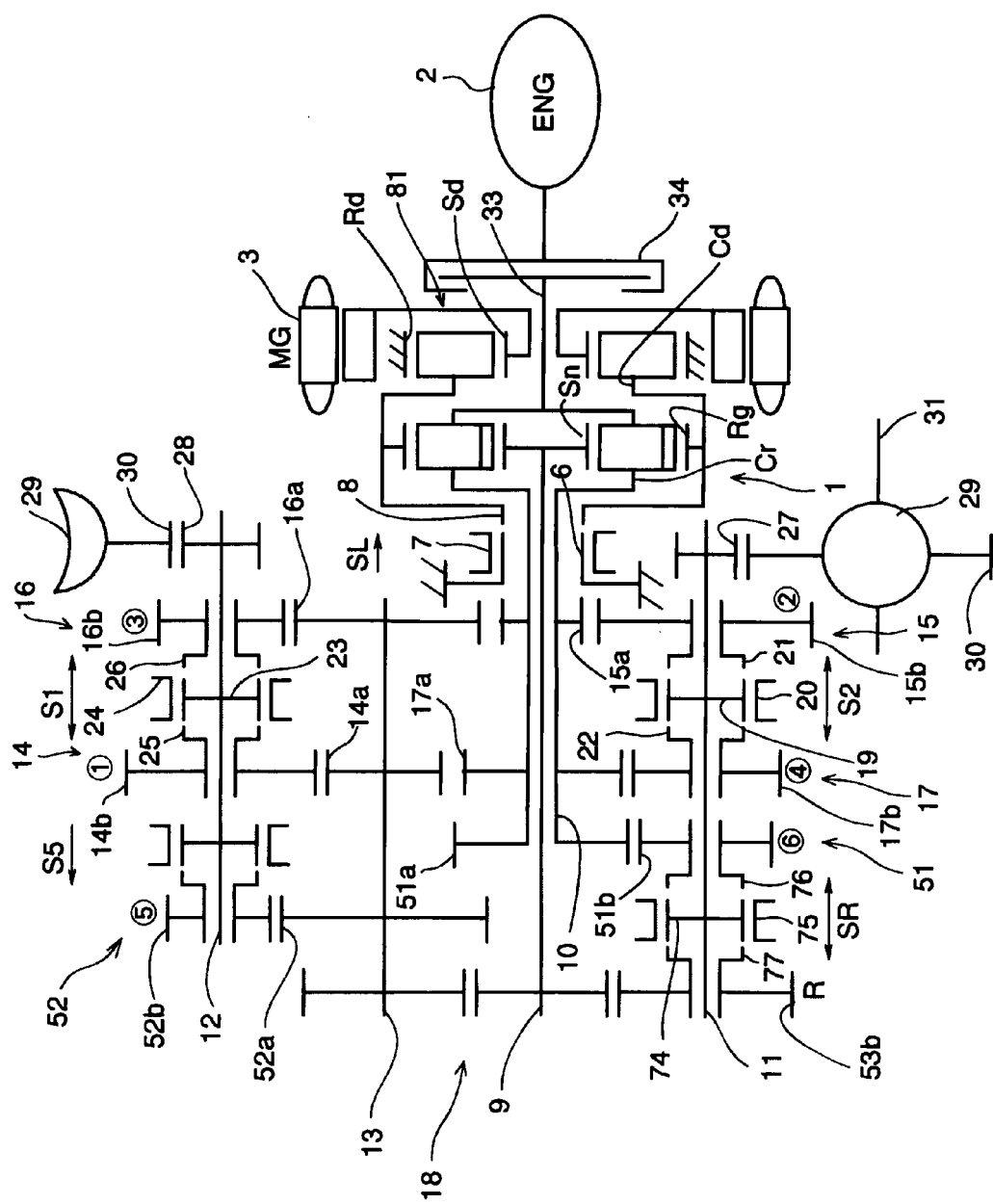
FIG. 23 is a skeleton diagram showing an example of a power transmission unit provided with a speed reducing mechanism for amplifying the torque of the motor generator.

In order to reduce the outer diameter of the power transmission unit, it is advantageous to reduce a diameter of the motor generator 3. In case of reducing the diameter of the motor generator 3, the power transmission unit of the present invention is adapted to increase the torque inputted from the motor generator 3 to the differential mechanism sufficiently. For this purpose, the example shown in FIG. 13 may be altered partially as shown in FIG. 23. In the example shown in FIG. 23, a speed reducing mechanism 81 is interposed between the ring gear Rg and the motor generator 3.

Specifically, as shown in FIG. 23, a single pinion type planetary gear mechanism serves as the speed reducing mechanism 81 is arranged between the planetary gear mechanism 1 and the engine 2 coaxially therewith. A ring gear Rd of the speed reducing mechanism 81 is fixed with the fixing member 40. Meanwhile, a sun gear Sd of the speed reducing mechanism 81 is connected with the rotor of the motor generator 3. Here, the motor generator 3 is arranged outer circumferential side of the speed reducing mechanism 81 concentrically therewith, and at least portion of the motor generator 3 is overlapped with the speed reducing mechanism 81. A carrier Cd of the speed reducing mechanism 81 is connected with the ring gear Rg of the planetary gear mechanism 1 functioning as a differential mechanism. The remaining elements are identical to those of the example shown in FIG. 13, therefore, further explanation of those elements will be omitted by allotting common reference numerals to FIG. 23.

According to the example shown in FIG. 23, therefore, the torque outputted form the motor generator 3 is inputted to the sun gear Sd of the speed reducing mechanism 81. However, since the ring gear Rd is fixed, the carrier Cd functioning as an output element is rotated at a speed lower than the rotational speed of the sun gear Sd. That is, the torque of the carrier Cd is amplified with respect to the torque inputted to the sun gear Sd from the motor generator 3, and the amplified torque of the carrier Cd is applied to the ring gear Rg of the planetary gear mechanism 1. Therefore, the torque of the motor generator 3 can be reduced relatively with respect to the torque required by the ring gear Rg. For this reason, a motor generator of the smaller capacity whose outer diameter is relatively small can be used as the motor generator 3 so that the power transmission unit can be downsized and lightened entirely.

Lastly, although the clutches adapted to spline the sleeve thereof to the hub are used in the examples thus far explained, the clutch means of the present invention should not be limited to the clutches used in the above-explained examples. Other kind of conventional clutches, for example, a frictional clutch, a clutch adapted to engage teeth formed on a surface of a pair of opposed discs, or to engage teeth formed on an end face of a pair of opposed cylindrical bodies or the like may also be used in the present invention. In addition, the clutch means can also be adapted to connect the drive gear selectively with the drive shaft, instead of connecting the driven gear selectively with the output shaft.

The invention claimed is:

1. A power transmission unit for a vehicle, the power transmission unit having: a first prime mover; a plurality of speed change gear pairs including a first speed change gear pair and a second speed change gear pair, each of the speed change gear pairs having a different gear ratio, and wherein a power outputted from the first prime mover is transmitted to one of the plurality of speed change gear pairs; an output member for outputting power transmitted from one of the plurality of speed change gear pairs; and a selective power transmission mechanism for allowing the transmitted power from the one of the plurality of speed change gear pairs to transmit to the output member by selecting one of the speed change gear pairs from said plurality of speed change gear pairs, comprising:

a second prime mover;

a differential mechanism, which has at least a first rotary element connected with the first prime mover, a second rotary element connected with the second prime mover, and a third rotary element, the differential mechanism being adapted to perform a differential action among at least the first, second, and third rotary elements of the differential mechanism;

a first speed change gear pair system, which has at least one of said plurality of speed change gear pairs, the first speed change gear pair system being arranged between the first rotary element and the output member;

a second speed change gear pair system, which has at least another of said plurality of speed change gear pairs, the second speed change gear pair system being arranged between the third rotary element and the output member;

a locking mechanism, which locks the second prime mover selectively to halt a rotation of the second prime mover, wherein the output member comprises a first output shaft and a second output shaft, both of the first and second output shafts being arranged parallel to a rotation axis of the differential mechanism;

an idler shaft is arranged parallel to the rotation axis of the differential mechanism;

the first speed change gear pair system includes a first drive gear to which a torque is transmitted from the first rotary element, and a first driven gear arranged on the first output shaft, the first drive gear and the first driven gear being said one of said plurality of speed change gear pairs; and the second speed change gear pair system includes a second drive gear to which a torque is transmitted from the third rotary element, the second drive gear is arranged on the idler shaft, and a second driven gear is arranged on the second output shaft, the second drive gear and the second driven gear being said another of said plurality of speed change gear pairs.

2. The power transmission unit for the vehicle as claimed in claim 1, wherein:

the differential mechanism includes a double pinion type planetary gear mechanism; and the second rotary element including a ring gear of the double pinion type planetary gear mechanism, the ring gear arranged to be situated around the first rotary element and the third rotary element, the first rotary element including any one of a sun gear and a carrier of the double pinion type planetary gear mechanism, and the third rotary element including the other of said sun gear or said carrier of the double pinion type planetary gear mechanism, and the planetary gear mechanism is adapted to rotate the third rotary element in a direction opposite to a rotational direction of the first rotary element when the vehicle is driven in the forward direction.

3. The power transmission unit for the vehicle as claimed in claim 1, further comprising:

a speed change control means, which locks the second prime mover by the locking mechanism when setting a predetermined gear stage such that the second speed change gear pair system transmits torque between the third rotary element and the output member, and wherein the speed change control means unlocks the second prime mover locked by the locking mechanism when setting another predetermined gear stage such that the first speed change gear pair system transmits torque between the first rotary element and the output member.

4. The power transmission unit for the vehicle as claimed in claim 1, further comprising:

a synchronizing means, which synchronizes a rotational speed of one of the speed change gear pair systems, which one of the speed change gear pair systems is shifted to from another of the speed change gear pair systems, which another of the speed change gear pair systems transmits a torque to the output member by a speed change operation, which speed change operation changes the speed change gear pair systems, wherein the rotational speed of the one of the speed change gear pair systems is achieved after the speed change operation by varying a rotational speed of the second prime mover when carrying out the speed change operation.

5. The power transmission unit for the vehicle as claimed in claim 4, further comprising:
a cooperative control means, which cooperatively controls output torques of the first and the second prime movers thereby preventing a rotational speed of the output member from being changed when the rotational speed of the second prime mover is varied by the synchronizing means.

6. The power transmission unit for the vehicle as claimed in claim 1, comprising:
a final reduction mechanism, which is adapted to perform a differential action, and to which torques are transmitted from the first and the second output shafts; and
wherein:
the first prime mover and the differential mechanism are arranged to share a common rotational axis which is the rotation axis of the differential mechanism;
both the idler shaft and the second output shaft are arranged to be situated above a plane, wherein the plane includes rotational center axes of both of the first prime mover and the final reduction mechanism when the power transmission unit is mounted on the vehicle; and
the first output shaft is arranged to be situated below the plane.

7. The power transmission unit for the vehicle as claimed in claim 1, wherein:
the selective power transmission mechanism includes a gear stage selecting means, which selects a gear stage in which the output member is allowed to output an increased torque when driving the vehicle by driving the second prime mover, the gear stage selecting means selecting between a gear stage to be set by transmitting the increased torque to the output member through the first speed change gear pair system, and a gear stage to be set by transmitting the increased torque to the output member through the second speed change gear pair system.

8. The power transmission unit for the vehicle as claimed in claim 1, further comprising:
a speed change control altering means, which alters a control content to carry out a speed change operation depending on (A) a driving mode in which a power outputted from the first prime mover is used to drive the vehicle and a power outputted from the second prime mover is used to assist to drive the vehicle, (B) a driving mode in which the vehicle is driven by the power of the second prime mover, or (C) a driving mode in which the vehicle is decelerating while regenerating energy by the second prime mover.

9. The power transmission unit for the vehicle as claimed in claim 1, wherein:
a reverse stage gear pair, which is selectively allowed to transmit torque between the third rotary element and the first output shaft, is arranged between the third rotary element and the first output shaft.

10. The power transmission unit for the vehicle as claimed in claim 1, further comprising:
a speed reducing mechanism, which transmits an output of the second prime mover to the second rotary element while reducing the speed of the output of the second prime mover.

11. The power transmission unit for the vehicle as claimed in claim 1, wherein:
the first rotary element of the differential mechanism is connected directly with the first prime mover.

12. The power transmission unit for the vehicle as claimed in claim 1, wherein:
the differential mechanism includes a double pinion type planetary gear mechanism; and
the second rotary element including a ring gear of the double pinion type planetary gear mechanism, the ring gear arranged to be situated around the first rotary element and the third rotary element, the first rotary element including any one of a sun gear and a carrier of the double pinion type planetary gear mechanism and the third rotary element including the other of said sun gear or said carrier of the double pinion type planetary gear mechanism.

13. The power transmission unit for the vehicle as claimed in claim 1, wherein:
the third rotary element is adapted to be rotated in a direction opposite to a rotational direction of the first rotary element before and after a speed change operation.

14. A power transmission unit for a vehicle, the power transmission unit having: a first prime mover; a plurality of speed change gear pairs including a first speed change gear pair and a second speed change gear pair, each of the speed change gear pairs having a different gear ratio, and wherein a power outputted from the first prime mover is transmitted to one of the plurality of speed change gear pairs; an output member for outputting power transmitted from one of the plurality of speed change gear pairs; and a selective power transmission mechanism for allowing the transmitted power from the one of the plurality of speed change gear pairs to transmit to the output member by selecting one of the speed change gear pairs from said plurality of speed change gear pairs, comprising:
a second prime mover;
a differential mechanism, which has at least a first rotary element connected with the first prime mover, a second rotary element connected with the second prime mover, and a third rotary element, and the differential mechanism being adapted to perform a differential action among at least the first, second, and third rotary elements of the differential mechanism;
a first speed change gear pair system, which has at least one of said plurality of speed change gear pairs, the first speed change gear pair system being arranged between the first rotary element and the output member;
a second speed change gear pair system, which has at least another of said plurality of speed change gear pairs, the second speed change gear pair system being arranged between the third rotary element and the output member;
a locking mechanism, which locks the second prime mover selectively to halt a rotation of the second prime mover;
a first clutch means, which switches the first speed change gear pair system to be connected directly with the first prime mover, and the first clutch means switches the first speed change gear pair system to be connected with the third rotary element; and
a second clutch means, which switches the second speed change gear pair system to be connected directly with the first prime mover, and the second clutch means switches the second speed change gear pair system to be connected with the third rotary element.

15. The power transmission unit for the vehicle as claimed in claim 14, wherein:
the first speed change gear pair system and the first clutch means are situated on a side across a center axis of the differential mechanism from a side where the second speed change gear pair system and the second clutch means are situated.

16. A power transmission unit for a vehicle, the power transmission unit having: a first prime mover; a plurality of speed change gear pairs including a first speed change gear pair and a second speed change gear pair, each of the speed change gear pairs having a different gear ratio, and wherein a power outputted from the first prime mover is transmitted to one of the plurality of speed change gear pairs; an output member for outputting power transmitted from one of the plurality of speed change gear pairs; and a selective power transmission mechanism for allowing the transmitted power from the one of the plurality of speed change gear pairs to transmit to the output member by selecting one of the speed change gear pairs from said plurality of speed change gear pairs, comprising:
a second prime mover;
a differential mechanism, which has at least a first rotary element connected with the first prime mover, a second rotary element connected with the second prime mover, and a third rotary element, the differential mechanism being adapted to perform a differential action among at least the first, second, and third rotary elements of the differential mechanism;
a first speed change gear pair system, which has at least one of said plurality of speed change gear pairs, the first speed change gear pair system being arranged between the first rotary element and the output member;
a second speed change gear pair system, which has at least another of said plurality of speed change gear pairs, the second speed change gear pair system being arranged between the third rotary element and the output member;
a locking mechanism, which locks the second prime mover selectively to halt a rotation of the second prime mover;
a third clutch means, which integrates the differential mechanism entirely by connecting at least two of the rotary elements of the first to the third rotary elements with each other;
a fourth clutch means, which allows the second speed change gear pair system selectively to transmit a torque between the third rotary element and the output member; and
a fifth clutch means, which allows the first speed change gear pair system selectively to transmit a torque between the first rotary element and the output member.

17. A power transmission unit for a vehicle, the power transmission unit having: a first prime mover; a plurality of speed change gear pairs including a first speed change gear pair and a second speed change gear pair, each of the speed change gear pairs having a different gear ratio, and wherein a power outputted from the first prime mover is transmitted to one of the plurality of speed change gear pairs; an output member for outputting power transmitted from one of the plurality of speed change gear pairs; and a selective power transmission mechanism for allowing the transmitted power from the one of the plurality of speed change gear pairs to transmit to the output member by selecting one of the speed change gear pairs from said plurality of speed change gear pairs, comprising:

a second prime mover;
a differential mechanism, which has at least a first rotary element connected with the first prime mover, a second rotary element connected with the second prime mover, and a third rotary element, the differential mechanism being adapted to perform a differential action among at least the first, second, and third rotary elements of the differential mechanism;
a first speed change gear pair system, which has at least one of said plurality of speed change gear pairs, the first speed change gear pair system being arranged between the first rotary element and the output member;
a second speed change gear pair system, which has at least another of said plurality of speed change gear pairs, the second speed change gear pair system being arranged between the third rotary element and the output member;
a locking mechanism, which locks the second prime mover selectively to halt a rotation of the second prime mover, wherein
the output member comprises a first output shaft and a second output shaft, both of the first and second output shafts being arranged parallel to a rotation axis of the differential mechanism;
the first speed change gear pair system includes a first drive gear to which a torque is transmitted from the first rotary element, and a first driven gear arranged on the first output shaft, the first drive gear and the first driven gear being said one of said plurality of speed change gear pairs; and
the second speed change gear pair system includes a second drive gear to which a torque is transmitted from the third rotary element and a second driven gear is arranged on the second output shaft, the second drive gear and the second driven gear being said another of said plurality of speed change gear pairs.

18. The power transmission unit for the vehicle as claimed in claim 17, wherein:
the first prime mover and the differential mechanism are arranged to share a common rotational axis which is the rotation axis of the differential mechanism; and
the power transmission unit comprises a reverse mechanism, which reverse mechanism outputs torque transmitted from the third rotary element of the differential mechanism while reversing a direction of the torque, and the reverse mechanism is arranged on the rotational axis of the first prime mover between the differential mechanism and the first speed change gear pair system or the second speed change gear pair system.

19. The power transmission unit for the vehicle as claimed in claim 18, further comprising:
a reverse gear pair comprising
a reverse drive gear, to which a reverse drive gear torque, which torque is not reversed by the reverse mechanism, is transmitted from the second rotary element to the reverse drive gear and which reverse drive gear is arranged coaxially with the differential mechanism, and
a reverse driven gear meshing with the reverse drive gear and the reverse driven gear being held by the output member; and
a sixth clutch means, which sixth clutch means allows the reverse gear pair selectively to transmit torque between the second rotary element and the output member.

20. The power transmission unit for the vehicle as claimed in claim 17, wherein:
the power transmission unit comprises a reverse mechanism which reverses a direction of a torque outputted from one of the first and the second output shafts such that the torque outputted from the one of the first and the second output shafts is in an opposite direction to the direction of the torque outputted from the other of the first and second output shafts.

21. The power transmission unit for the vehicle as claimed in claim 20, wherein:
the reverse mechanism is arranged on an output side of the second output shaft; and
the power transmission unit further comprises a reverse driven gear which sets a reverse stage, and which reverse driven stage gear is situated between the third rotary element and the first output shaft.

22. The power transmission unit for the vehicle as claimed in claim 20, wherein:
the reverse mechanism is arranged on an output side of the second output shaft; and
the power transmission unit further comprises:
a reverse driven gear which sets a reverse stage, and which reverse driven gear is situated between the first rotary element and the second output shaft; and
a friction start mechanism which increases a torque transmission capacity continuously, and which friction start mechanism is situated between the first prime mover and the first rotary element.

* * * * *